(12) United States Patent
Hinman

(10) Patent No.: US 11,840,329 B1
(45) Date of Patent: Dec. 12, 2023

(54) CONTRA-ROTATING ELECTRIC HELICOPTER

(71) Applicant: SiFly Aviation, Inc., Carmel Valley, CA (US)

(72) Inventor: Brian L Hinman, Carmel Valley, CA (US)

(73) Assignee: SiFly Aviation, Inc., Carmel Valley, CA (US)

( * ) Notice: Subject to any disclaimer, the term of this patent is extended or adjusted under 35 U.S.C. 154(b) by 0 days.

(21) Appl. No.: 17/983,111

(22) Filed: Nov. 8, 2022

Related U.S. Application Data

(60) Provisional application No. 63/276,891, filed on Nov. 8, 2021.

(51) Int. Cl.
| | |
|---|---|
| *B64C 27/10* | (2023.01) |
| *B64D 27/24* | (2006.01) |
| *B64C 1/26* | (2006.01) |
| *B64D 35/00* | (2006.01) |
| *B64C 27/78* | (2006.01) |

(52) U.S. Cl.
CPC ............... *B64C 27/10* (2013.01); *B64C 1/26* (2013.01); *B64C 27/78* (2013.01); *B64D 27/24* (2013.01); *B64D 35/00* (2013.01); *B60L 2200/10* (2013.01)

(58) Field of Classification Search
CPC .......... B64C 1/26; B64C 27/10; B64C 27/78; B64D 27/24; B64D 35/00; B60L 2200/10
USPC ........................................ 244/17.23
See application file for complete search history.

(56) References Cited

U.S. PATENT DOCUMENTS

| | | | | |
|---|---|---|---|---|
| 2,350,962 | A * | 6/1944 | Hays ...................... | B64C 27/10 416/201 A |
| 2,707,601 | A * | 5/1955 | Magill .................... | B64C 27/04 244/17.23 |
| 8,894,001 | B2 * | 11/2014 | Calverley ................. | F03D 9/25 244/17.23 |
| 11,046,404 | B2 | 6/2021 | Lin et al. | |
| 2005/0236518 | A1 * | 10/2005 | Scott ...................... | B64C 27/322 244/17.23 |
| 2006/0231677 | A1 * | 10/2006 | Zimet ...................... | B64C 27/10 244/17.23 |
| 2007/0290563 | A1 * | 12/2007 | Zhao ....................... | H02K 51/00 310/266 |
| 2014/0131510 | A1 * | 5/2014 | Wang ..................... | B64C 39/024 244/17.23 |
| 2015/0028152 | A1 * | 1/2015 | Eller ....................... | B64C 27/10 244/17.13 |

(Continued)

FOREIGN PATENT DOCUMENTS

JP     2012-11990 A     1/2012

OTHER PUBLICATIONS

Hinman, U.S. Appl. No. 17/892,540 titled "Electric Rotorcraft Cyclic Control System", filed Aug. 23, 2022, 55 pages.

(Continued)

*Primary Examiner* — Brady W Frazier
(74) *Attorney, Agent, or Firm* — Sunstein LLP

(57) ABSTRACT

A contra-rotating electric helicopter utilizes an electric motor having a base and an output shaft and a power source. The helicopter couples the base to a first rotor, thus allowing both the base and the power source to rotate within the frame of reference of the first rotor, while a contra-rotating and coplanar second rotor is coupled to the output shaft of the electric motor.

18 Claims, 17 Drawing Sheets

(56) References Cited

U.S. PATENT DOCUMENTS

| | | | |
|---|---|---|---|
| 2017/0283049 A1* | 10/2017 | Weiner | B64C 27/80 |
| 2020/0231275 A1 | 7/2020 | Groman | |
| 2021/0101675 A1* | 4/2021 | Tsutsumi | B64D 27/24 |
| 2021/0276706 A1* | 9/2021 | Heironimus | B64C 11/44 |
| 2021/0291971 A1* | 9/2021 | Bernard | B64C 9/00 |

OTHER PUBLICATIONS

Hinman et al., U.S. Appl. No. 63/359,944, titled "Rotor System for Electrically Powered Rotorcraft", filed Jul. 11, 2022, 35 pages.

Johnson, W. and Silva, C., "Observations from Exploration of VTOL Urban Air Mobility Designs" Presented at the 7th Asian/Australian Rotorcraft Forum, Jeju Island, Korea, Oct. 30-Nov. 1, 2018, 15 pages.

\* cited by examiner

| Contra-rotating Electric Helicopter | | | | | | |
|---|---|---|---|---|---|---|
| Aircraft Without Blades and Battery Module | 5.10 | lbs | 1.113 | kg | 29% | |
| Blades | 2.65 | lbs | 1.200 | kg | 32% | |
| Battery Module | 3.28 | lbs | 1.489 | kg | 39% | |
| Total | 11.03 | lbs | 3.802 | kg | 37.26 | N |
| Air Density | 1.225 | kg/m^3 | | | | |
| | | | | | | |
| Disk Loading | 0.140 | lbs/ft^2 | | | | |
| Number of Blades | 4 | | | | | |
| Blade Length | 1.476 | m | | | | |
| Blade Chord | 0.162 | m | | | | |
| Blade Length/Chord | 9.11 | | | | | |
| Solidity | 13.1% | | | | | |
| Mechanical Pitch Angle at Blade Tip | 11.0 | degrees | | | | |
| delta, average drag coefficient | 0.0210 | | | | | |
| Cl(ave), average lift coefficient | 0.70 | | | | | |
| Ct/Solidity | 0.117 | | 0.120 is Max | 0.075 | Typical | |
| Ct = Cl(ave) * Solidity / 6 | 0.01525 | | | | | |
| Cp, Cq = (Ct^1.5/sqrt(2)) + (solidity*delta/8) | 0.00167 | | | | | |
| Llambda-H, Induced Inflow Ratio | 0.06175 | | | | | |
| Inflow Angle at Tip | 3.54 | degrees | | | | |
| Inflow Angle at 75% Chord | 4.71 | degrees | | | | |
| Induced Velocity | 1.44 | m/S | 3.2 | mph | | |
| Tip Speed | 23.35 | m/S | 52.2 | mph | | |
| Rotor rate (Upper and Lower Contra) | 15.30 | rad/S | 146.1 | rpm | 2.43 | rps |
| Motor rate | 30.59 | rad/S | 292.1 | rpm | 4.87 | rps |
| Low Speed, Mu = 0.15 | 3.50 | m/S | 7.8 | mph | | |
| Cruise Speed, Mu = 0.23 | 5.37 | m/S | 12.0 | mph | | |
| High Speed, Mu = 0.30 | 7.00 | m/S | 15.7 | mph | | |
| | | | | | | |
| Rotor Area | 78.78 | ft^2 | 7.32 | m^2 | | |
| Rotor Radius | 5.0 | ft | 1.53 | m | | |
| Rotor Diameter | 10.0 | ft | 3.05 | m | | |
| Rotor Merit Factor | 80% | | | | | |
| | | | | | | |
| Idealized Hover Power | 53.7 | W | | | | |
| Realized Hover Power | 67.5 | W | | | | |
| Realized Cruise Power | 47.3 | W | | | | |
| | | | | | | |
| Batt. Energy Density | 265 | Wh/kg | | | | |
| Cell Fraction / Total | 90% | | | | | |
| Battery Energy | 355.1 | Whr | | | | |
| Motor Efficiency, Including Gear Reduction | 52% | | | | | |
| Controller Efficiency | 95% | | | | | |
| Battery Hover Power | 136.7 | W | | | | |
| Battery Cruise Power | 95.7 | W | | | | |
| | | | | | | |
| Hover Time | 155.8 | minutes | 2.60 | hours | | |
| Cruise Time | 222.6 | minutes | 3.71 | hours | | |

FIG. 12

CONTRA-ROTATING ELECTRIC HELICOPTER

The present application claims the benefit of provisional application Ser. No. 63/276,891, filed Nov. 8, 2021, which is hereby incorporated herein by reference in its entirety.

TECHNICAL FIELD

The technical field is rotorcraft design, and more specifically to the design of a simple electric helicopter.

BACKGROUND ART

Rotorcraft became practical almost one hundred years ago. The key enabling technology was the internal combustion engine with adequate power-to-weight ratio. Early helicopters were powered by piston engines, while more recent helicopters tend to be powered by turboshaft engines, which offer a higher power-to-weight ratio. Helicopters have seen widespread use in military and industrial applications. During the 1950s and 1960s, helicopters were envisioned as a mass-market transportation modality, particularly from airports to downtown landing locations. Costs remained high however, limiting helicopter use to wealthy consumers and business executives. A turning point for commercial helicopter flights was the tragic accident of New York Airways on the roof of the PanAm building in New York in 1977. Five people died when a Sikorsky S-61 tipped over, killing four people on the roof of the building, and one person on the street below. The perception of helicopter travel being both expensive and unsafe has relegated consumer use primarily to niche applications such as sightseeing tours.

Over the last decade, we have witnessed a gradual transition of ground-based transportation toward electrification and automation technologies. Electrification of automobiles reduces the dependence upon fossil fuels, while automation moves us toward a mobility network without human drivers. Multiple automobile manufactures have committed to producing only electric vehicles by the year 2035. These same macro trends are beginning to reshape aviation, bringing a range of benefits: reducing operating cost, reducing environmental impact, and enabling new applications.

Much recent development has focused on electric vertical take-off and landing (eVTOL) aircraft, principally to enable mass-market "urban air mobility." While these aircraft are capable of hovering for takeoff and landing, operating from locations without runways, most designs have been optimized for high-speed forward flight. The typical eVTOL has a modest physical span relative to an airplane, operating with a disk loading (weight divided by swept area of the rotors) of more than 8 pounds/square-foot. Efficiency in hovering flight tends to be quite poor, both because of the high disk loading, and the operation of the electric motors at a torque much greater than that required for optimal efficiency. In forward flight, however, the typical eVTOL has a lift-to-drag ratio of at least 17:1, and the electric motors operate at higher efficiency with lower torque. The most popular eVTOL architectures fit in two categories: tilt-rotors and lift-plus-cruise. The first architecture has a multiplicity of rotors which begin in a horizontal orientation for take-off, and transition to a vertical orientation for forward flight. Varying the rotor angular velocity and pitch provides attitude control during the hovering state, while airplane-like control surfaces provide attitude control during forward flight. Lift-plus-cruise architectures are those having rotors for hover, principally fixed in a horizontal plane of rotation, and at least one rotor that is fixed in a vertical orientation to provide thrust for forward flight. As with the tilt-rotor architectures, lift-plus-cruise eVTOLs include airplane-like control surfaces to achieve attitude control in forward flight. The mechanical and electrical complexity of eVTOLs targeting urban air mobility is quite high, resulting in extended and expensive development cycles, and likely high costs of manufacture and maintenance.

At this dawn of electric aviation, one can envision a number of applications for electric rotorcraft other than urban air mobility. For example, surveillance, photography, mapping, cargo delivery, aerial advertising and weapon delivery can all be addressed with new rotorcraft employing electrification and automation technologies. While high-speed forward flight is the most important attribute for eVTOLs targeting urban air mobility, other applications will require much longer flight times and lower noise. For any rotorcraft operating in a hovering state during a large fraction of its mission, the key to extending the flight time and lowering the noise is reducing the disk loading. Reduced disk loading translates to rotorcraft having larger and more slowly turning rotors, while opening the opportunity for simpler architectures relative to those required for urban air mobility. The purpose of embodiments of the invention described herewith is to introduce a new architecture for a contra-rotating electric helicopter with the unique attributes of being mechanically simple, highly reliable, extremely low noise, and offering long flight times with existing battery technology.

Leonardo da Vinci has been credited with the conception and testing of the first human-carrying helicopter. FIG. 1 illustrates a portion of da Vinci's notebook sketch for what he called an "aerial screw." From da Vinci's notebook, historians have concluded that a prototype was constructed from a frame of pine wood, covered with silk fabric. This first helicopter had a rotor diameter of 33 feet, intended to lift off the ground under the power of four men who would turn the screw from the deck constructed at the base. The prototype was tested on Jan. 3, 1496, more than 407 years before the Wright Brothers made the first powered flight at Kitty Hawk, North Carolina.

For many reasons, da Vinci's aerial screw never became airborne. It lacked the power necessary for the weight of four men and a wooden aircraft, and there was no provision to overcome the rotor torque that would cause the base to spin in the opposite direction of the lifting "screw." It would be centuries before compact power sources would become available to solve the first problem. The second problem was arguably the easier to solve, though Newton had not established the foundational knowledge of classic physics until the publication of Principia Mathematica in 1687, 191 years after da Vinci tried to fly the first helicopter.

Approaching the 20th century, engineers and scientists began to find solutions to the key problems that needed to be solved for heavier-than-air vertical flight to become a reality. These problems included: developing dense power sources, devising systems to counteract rotor torque, developing systems to shift the center of thrust so as to stabilize the aircraft and allow movement in a horizontal plane, and creating flight controls that would allow a pilot to achieve stability and navigate a desired course.

The first helicopter to hover with a human pilot onboard was the tandem rotor helicopter developed and flown by Paul Cornu in 1907, shown in the photograph of FIG. 2. Having two horizontally displaced rotors spinning in opposite directions, Cornu effectively dealt with the main rotor torque issue, creating forces that cancel one another as applied to the fuselage. Cornu reportedly flew the helicopter for several seconds, at an altitude of less than 1 meter. A modem analysis of the design demonstrates that it had insufficient power to hover beyond ground effect. Moreover, the control system consisted of vanes to direct the downward airflow of the rotors, which proved to be ineffective. Cornu abandoned the design without improvement, though he earned credit as the first person to build and fly a helicopter.

By the 1920s, Etienne Oehmichen in France, as well as George de Bothezat, a Russian immigrant to the United States, had developed quad-rotor helicopters, today called quad copters, a new architecture to deal with both the torque issue as well as allowing lateral control. The Oehmichen quad copter is shown in FIG. 3, taking flight on May 8, 1924. Two of the rotors disposed on opposite sides of the center of gravity turned clockwise, and the other two rotors, also disposed on opposite sides of the center of gravity, turned counter-clockwise. Yaw control occurred by adjusting the blade pitch of the clockwise rotor pair relative to the blade pitch of the counter-clockwise rotor pair. Pitch and roll control occurred by adjusting the front-to-back or side-to-side pairings of rotor blade pitch. In the absence of computer control systems, the pilot workload in early quad-copters was very high, and thus these early designs never reached a point of viability for any application. Almost 80 years later, Draganfly introduced the first quad-copter drone for consumers, and the industry has since grown to many companies selling millions of quad-copters for consumer, commercial and military purposes. Unlike the early quad-copters that operated by adjusting blade pitch, modem quad-copters operate through an adjustment of angular velocity of four electrically-powered rotors. Onboard computers with inertial sensors allow stable flight, addressing the pilot workload issue of early attempts.

Though it was not the first to fly, the helicopter perfected by Igor Sikorsky is considered the classical helicopter. FIG. 4 is a photograph of Igor Sikorsky test flying his prototype single-rotor helicopter on Sep. 14, 1939. Even today, the design is the most common configuration of human-carrying vertical flight aircraft. In brief, the single-rotor helicopter design includes a main rotor with a swashplate, and a vertically disposed tail rotor to counteract the torque created from drag forces on the main rotor. Though little known, a Russian engineer named Yuriev first proposed the use of the swashplate for a helicopter. He constructed the first prototype of a helicopter that looks similar to the classic helicopter in 1912. The swashplate is the critical sub-system for a classic helicopter, as it allows both "collective" and "cyclic" control of the main rotor. "Collective" refers to an adjustment of the average pitch of the rotor blades, resulting in an increase or decrease of the integrated thrust magnitude, while "cyclic" refers to a variation of blade pitch as a function of angular position, resulting in a shifting of the integrated thrust center. When in a stable hovering state, the thrust of the tail rotor, multiplied by the distance from the main rotor hub, creates a torque which exactly counteracts the drag-induced torque of the main rotor.

The tail rotor of a classic helicopter is sometimes replaced by a ducted fan, often described as a Fenestron, a trademarked term of Airbus SE. The Fenestron offers improved safety compared with an exposed tail rotor, and greatly reduced noise, by including a multiplicity of rotor blades, typically with unequal spacing. Another substitute for a tail rotor is the use of entrained turboshaft exhaust gases to create thrust through the Coanda effect. This approach was successfully adopted by McDonnell Douglas Helicopter in their "NOTAR" (no tail rotor) helicopters.

Other rotorcraft configurations include intermeshed rotors, spinning in counter rotation to one another, tip-jet helicopters, whereby the thrust is applied at the tips of the rotor blades, eliminating torque to the helicopter fuselage, and ducted fan aircraft with twisted stators, counter-acting the torque of the of the powered rotor with stators that redirect the airflow. Recently, there have been a number of multi-copter configurations that include many rotors. Most of these configurations have an equal number of rotors turning clockwise and counter-clockwise, as a means to counteract the torque applied to the fuselage. However, there are designs with an odd number of rotors that achieve the same effect, and certainly stacking rotors that are in contra-rotation has become a popular solution to the fuselage torque problem.

Of particular association with the contra-rotating electric helicopter disclosed herein are those helicopters described as either contra-rotating or coaxial helicopters. All of these designs share a common physical characteristic of having two rotors stacked in the vertical direction. The rotors typically share a common axis of rotation, and the physical size of the rotors is usually similar. Most of the contra-rotating or coaxial helicopters have the rotors placed above a fuselage, which remains in a non-rotating frame of reference. This configuration was the first practical proposal to solve the rotor torque problem inherent with the da Vinci aerial screw. It was first described by a Russian scientist named Mikhail Lomonosov, who developed a small helicopter model with contra-rotating rotors in July 1754, and demonstrated it to the Russian Academy of Sciences. The first patent for a coaxial helicopter was awarded to Henry Bright by the British Patent Office in 1859. The first practical coaxial helicopter to fly was developed by the Frenchmen, Louis Breguet and Rene Dorand. FIGS. 5A, 5B and 5C are line drawings for the Breguet/Dorand coaxial helicopter from 1933. Their "Gyroplane Laboratorie" first flew on Jun. 26, 1935, more than four years before Igor Sikorsky flew the VS-300, considered by many as the first practical helicopter. While not as well-known as the Sikorsky helicopter, the Breguet/Dorand coaxial helicopter achieved flights of more than one hour over a 44 km closed course by November of 1936. Development of the Breguet/Dorand helicopter was halted with the outbreak of World War II.

There are several benefits of the contra-rotating helicopter configuration. First, it solves the torque problem inherent with a rotor powered from a motor in the stationary frame of the fuselage. Second, it eliminates the power loss associated with a tail rotor, which by itself does not provide lift. Third, it requires less induced power than a single-rotor helicopter having the same rotor diameter, making it more efficient in hover. Fourth, it eliminates the human hazard of the tail rotor, which spins at a height where passengers may inadvertently make contact. And fifth, it solves the dissymmetry asymmetry of lift problem that occurs in forward flight for a single-rotor helicopter. That is, the advancing blade creates more lift than the retreating blade, due to the differential airspeed of the blade on either side of the rotor, which requires a cyclic response to effectively counteract the shift of the thrust center. Ultimately, single rotor helicopters with non-rigid rotor systems are limited to a cruise speed of about 30% of the rotor tip speed, due to the stalling of the blades on the retreating side of the rotor disk. With contra-rotating rotors, the clockwise rotating rotor has its advancing blade on the left of the fuselage, while the counter-clockwise rotating rotor has its advancing blade on the right of the fuselage. Because the combined lift of the rotors remains relatively constant in forward flight, contra-rotating helicopters can fly stably to a higher airspeed relative to the rotor tip speed, as compared with a single-rotor helicopter. The tradeoff, however, is that the contra-rotating helicopters require greater power in high-speed forward flight than an equivalently sized single-rotor helicopter, due to the increased parasitic drag of two rotor systems.

With so many advantages of the contra-rotating helicopter configuration, the question arises, why has it not become the dominant helicopter design? The common answer of engineers is one of mechanical complexity. Because the angular velocity of both rotors is typically held constant throughout flight, due to the slow response of internal combustion engines, both the upper and lower rotors have collective control and cyclic control. Hence, the design of the typical contra-rotating helicopter requires two interconnected swashplates, one for each of the two rotors, and a complex transmission, driving coaxial rotor shafts in opposite directions. While Igor Sikorsky's first experimental helicopters were both contra-rotating configurations, his early work was unsuccessful, due in part to the complexity of the contra-rotating design. He ultimately perfected the first commercial helicopter, the VS-300, with a single main rotor, including a swashplate, and a vertically disposed tail rotor with collective control. There were others who achieved early commercial success with contra-rotating helicopters, including JSC Kamov, a Russian rotorcraft manufacturing company established in 1940. However, the contra-rotating helicopter remains a small fraction of all helicopters manufactured today.

The introduction of electric propulsion and automation systems raises the opportunity to revisit many of the original rotorcraft concepts, applying these new technologies to solve problems in ways never before possible. The incredible recent success of quad-copter drones is a perfect example. Electric motors, having fast response and virtually constant torque capability over angular velocity, allow rotors to be controlled by angular velocity variation instead of blade pitch control, greatly simplifying mechanical design. Low-cost and light weight inertial sensors and computers allow rotorcraft stabilization in ways that would have seemed like science fiction in 1940.

With regard to contra-rotating helicopter designs employing electric motors, there have been proposals to simplify their construction, for example by attaching the motor housing to one rotor, and the output shaft of the motor to the other rotor. In a Japanese patent application from 2010, Takeshika disclosed a "Contra-rotating Propeller Motor," published in JP 2012011990A. He describes "a propeller, rotor and fan on the rotor and field (case) of at least one electric motor to counter torque." Takeshika states the advantages of: "(1.) not requiring a gearbox, (2.) the reverse torque can be completely cancelled, (3.) there is no reverse torque at any number of revolutions and (4.) lightweight and compact." However, to power his contra-rotating propeller motor, Takeshika describes the use of brushes and slip rings to convey power from a stationary frame to the rotating frame of the motor. Thus, while he eliminated the transmission of a typical coaxial rotor helicopter, he introduced a friction-based power interface that likely has lower reliability than the transmission which he eliminated. More recently, Groman has disclosed a "Dual Rotor System" through the publication of his patent filing, US 20200231275A1. He describes a contra-rotating dual rotor system to be driven by an electric motor disposed outside the rotor system. Groman conceives of a first rotor to be driven from the central shaft of the motor, and a second coaxial shaft, via an extension of the motor housing. He states that "when the motor is powered, the rotors rotate in opposite directions."

Moreover, Groman describes the shifting of the motor mass through a universal joint as this "allows for the rotors to easily be tilted," without recognizing that the inertial moment of the rotor makes this completely impractical.

SUMMARY OF THE EMBODIMENTS

In one embodiment of the present invention, a contra-rotating electric helicopter utilizes an electric motor having a base and an output shaft and a power source. The helicopter couples the base to a first rotor, thus allowing both the base and the power source to rotate within the frame of reference of the first rotor, while a contra-rotating and coplanar second rotor is coupled to the output shaft of the electric motor. The torque on the motor shaft resulting from aerodynamic drag forces on the second rotor imposes a torque on the combined body of the first rotor, electric motor and power source. When the first and second rotors are of similar size, number of blades and blade pitch, the second rotor will spin in contra-rotation to the first rotor, achieving a state of equilibrium whereby both rotors have similar angular velocity. In effect, the motor operates with a 2:1 gear reduction, with roughly half the motor speed turning one of the rotors in a clockwise direction, while the other half of the motor speed turns the other rotor in a counter-clockwise direction. This is somewhat a simplification of the aerodynamics, however, because the rotor-to-rotor interaction causes a differential in both lift and drag, and consequently rotor angular velocity.

For many embodiments, the first rotor, which is coupled to the battery mass, is advantageously the lower of the two rotors, because flight stability is improved when the center of gravity is below the center of thrust. This is not a requirement, however, and some embodiments may have the first rotor in the upper position. One reason to do put the first rotor in the upper position, for example, would be to simplify the integration of a ballistic recovery system. Having the power and control systems on top eliminates the necessity of carrying signals between the two rotating frames of reference, which would otherwise be necessary to activate the ballistic recovery system if the first rotor were on the bottom.

Considering the case of the first rotor being the lower of the two rotors, one can envision the start-up process. Upon initial rotation of the electric motor, for example from a position on the ground, the first rotor may remain stationary if the friction force between the base of the first rotor sub-system and the ground is sufficient to withstand the torque imposed by the aerodynamic drag of the second rotor in rotation. As the angular velocity of the motor increases, the lifting force of the second rotor will increase, as will the torque imposed upon the first rotor sub-system. Eventually, the reduction of the coefficient of friction between the ground and the first rotor sub-system, combined with the increasing torque imposed upon the first rotor sub-system, will cause the first rotor to begin to spin in contra-rotation with respect to the second rotor. The rotational inertial energy within the first rotor sub-system will gradually rise, as will the angular velocity of the first rotor system. Soon, the rotors reach an equilibrium state of contra-rotation, having similar but opposite angular velocity.

By including the power source within a rotating frame of reference, the need for slip rings and other mechanisms to convey power from a stationary to rotating frame of reference is eliminated. For many embodiments, the flight control computer, inertial sensors, magnetometer, GPS receiver, telemetry transceiver and power management all reside within the rotating frame of reference of the first rotor. To control the contra-rotating electric helicopter, it is necessary to have integrated thrust and cyclic control, as required for all helicopters, though yaw control is not required for embodiments without a fuselage in a stationary frame of reference. To simplify the design of embodiments of a contra-rotating electric helicopter in accordance with the present invention, as opposed to contra-rotating helicopters utilizing two swashplates, the angular velocity of the electric drive motor is modulated to adjust the integrated thrust, and a simple and novel cyclic control is employed for the first rotor system. In the U.S. Provisional Patent Application, Ser. No. 63/240,209, filed Sep. 2, 2021, and the U.S. Non-Provisional patent application Ser. No. 17/893,540, filed Aug. 23, 2022, incorporated herein by reference as "my Electric Cyclic Control Application," the herein inventor describes a rotor system with a shaft shared between two rotor blades on either side of the rotor hub. At a neutral position of no applied cyclic response, both rotor blades have the same pitch, for example 11 degrees. A limited-angle electric motor acting upon the shared shaft causes one blade to increase in pitch while the other blade decreases in pitch, effecting a cyclic response, which can be synchronized with the 360-degree position of the rotor. The shared shaft need only move over an angle of +/−7 degrees, for example, to result in lateral control of the rotorcraft through a variety of flight conditions. Again, for simplicity, in some embodiments the second rotor has no provision to adjust either cyclic or collective blade pitch, rather providing an integrated thrust that depends upon the angular velocity of the drive motor, the forward speed of flight, and the air conditions.

Many embodiments of the contra-rotating electric helicopter lack collective control for either rotor, meaning that the time-averaged blade incidence angle remains constant. In these instances, the integrated thrust is adjusted solely through a variation in electric motor angular velocity. While simplifying the mechanical design of the helicopter, the lack of collective control introduces a safety issue, namely the inability to sustain autorotative flight upon a catastrophic loss of power. Some embodiments of the contra-rotating electric helicopter utilize an innovation introduced in U.S. Provisional Patent Application, Ser. No. 63/359,944, filed Jul. 11, 2022, attached hereto and incorporated herein by reference as "my Rotor System for Electrically Powered Rotorcraft." In this application, the herein inventor describes a novel rotor system including a spring-actuated mechanism to automatically reduce the rotor blade incidence upon a loss of motor torque, allowing the rotorcraft to sustain autorotative descent. Some embodiments of the contra-rotating electric helicopter incorporate said novel rotor system for the second rotor, while incorporating the previously described shared-shaft cyclic control innovation for the first rotor.

In a traditional helicopter having a swashplate, the cyclic response is applied from a stationary frame of reference, causing the rotor blades to go through a sinusoidal variation of pitch that is synchronized with the rotor position over 360 degrees of rotation. For the novel contra-rotating electric helicopter described herein, many embodiments will lack a stationary frame of reference, and the cyclic mechanism itself is within a rotating frame of reference. To avoid the need for a stationary frame of reference solely for the purpose of cyclic control, and to avoid having to convey signals and power between the stationary frame of reference and the rotating frame of reference, for many embodiments the flight computer within the rotating frame of reference includes sensors, for example magnetometers, that allow it to ascertain the azimuthal orientation with regularity throughout rotation.

For small rotor diameter embodiments, the output shaft of the electric motor directly drives the second rotor. For large rotor diameter embodiments, it is advantageous to include a concentric gear reduction mechanism at the output of the motor, allowing the second rotor to operate at a lower angular velocity, albeit with greater torque. The tradeoff between the increased weight of the gear reduction mechanism versus the increased shaft power afforded through higher motor angular velocity has been studied for eVTOL designs. Johnson and Silva (NASA Ames 2018) conclude that rotor systems greater than 4 feet in diameter would benefit in power density with gear reduction. What has been less discussed with regard to eVTOL designs is the impact of electric motor torque on motor efficiency. While electric motors have the capability of delivering high torque over a full range of angular velocity, the motors operate most efficiently in the range of 10% to 13% of the stalled-motor torque. As rotor diameters increase, angular velocity naturally drops, thus pushing electric motors into a higher torque condition. Unlike the analysis of the gearing mechanism with regard to the improvement in power system weight, which is typically 10% of the overall aircraft weight, reductions in motor efficiency impact the entire aircraft, reducing flight time in proportion to the motor efficiency. Considering both the powerplant energy density as well as the optimal motor torque, most rotorcraft larger than consumer drones would benefit from gear reduction.

Some applications of the contra-rotating electric helicopter do not require a stationary frame of reference. For example, an embodiment designed specifically for mapping has a camera facing outward from a position on the lower portion of the rotating frame of reference of the first rotor sub-system. The rotation of the camera over 360-degrees allows for a synthetic view of the entire azimuth, without the need for gimbal motors or wide-angle lenses. However, other embodiments of the contra-rotating electric helicopter in accordance with the present invention do require a stationary frame of reference, such as those carrying human passengers. In these instances, embodiments include a rotational interface between the center of rotation of either the upper or lower rotor sub-systems, so as to allow a stationary frame of reference to be established below the lower rotor sub-system, or above the upper rotor sub-system. In some embodiments, the rotational interface is passive, allowing a fuselage or payload to rotate freely, or augmented with a tail fin to align with the direction of forward flight. In other embodiments, the rotational interface is an active gimbal motor, allowing a fuselage or payload to face an arbitrary azimuthal direction.

In one embodiment, the present invention provides an electrically powered vertical-lift aircraft. This embodiment includes a power source; an electric motor having a base and an output shaft configured to rotate relative to the base, the motor coupled to the power source; a first lifting rotor having a first axis of rotation and at least one rotor blade, the first rotor coupled to the base of the motor; and a second lifting rotor having a second axis of rotation and at least one rotor blade, the second axis of rotation being coaxial with the first axis of rotation, the second rotor coupled to the output shaft of the electric motor. Optionally, the first and second lifting rotors have corresponding first and second sets of blades, further comprising pitch adjustment means for adjusting, in a time-varying fashion, an angle-of-attack of blades selected from the group consisting of the first set of blades and the second set of blades and a combination thereof. Alternatively, or in addition, the aircraft further includes a gear reduction mechanism coupled between the output shaft of the electric motor and the second lifting rotor. Optionally, the power source includes a battery. Also optionally, the power source includes a photovoltaic array. As a further option, the power source includes a fuel cell. Optionally, the second lifting rotor has a plane of rotation and is configured with at least one blade having a coning angle with respect to the plane of rotation. Optionally, a lower portion of the first lifting rotor includes a rotating bearing, the aircraft further comprising a fuselage mounted beneath the rotating bearing. In a further related embodiment, the aircraft further includes a vertically disposed fin attached to the fuselage, the fin configured to force alignment of the fuselage in the direction of forward flight.

In another embodiment, the invention provides an electrically powered vertical-lift aircraft, the aircraft including a plurality of electric motors, each motor having a base and an output shaft; a transmission, coupled to the output shafts of the plurality of electric motors, configured to combine power from the output shafts into a shared output shaft; a first lifting rotor, having at least one rotor blade and a first axis of rotation, coupled to the bases of the plurality of electric motors; and a second lifting rotor, having at least one rotor blade and a second axis of rotation being coaxial with the first axis of rotation, the second lifting rotor being coupled to the shared output shaft. Optionally, the first and second lifting rotors have corresponding first and second sets of blades, the aircraft further comprising a pitch adjustment means for adjusting, in a time-varying fashion, an angle-of-attack of blades selected from the group consisting of the first set of blades and the second set of blades and a combination thereof. Also optionally, the power source includes a battery. As another option, the power source includes a photovoltaic array. As a further option, the power source includes a fuel cell. Optionally, the second lifting rotor is configured with at least one blade having a coning angle with respect to the second plane of rotation. Optionally, the aircraft further includes a rotating bearing disposed in a lower portion of the first rotor and a fuselage mounted beneath the first rotor. Optionally, the aircraft further includes a vertically disposed fin attached to the fuselage, the fin configured to force alignment of the fuselage in the direction of forward flight.

In another embodiment, the invention provides an improved electrically powered vertical-lift aircraft of the type including at least one rotor having a set of blades wherein the improvement comprises a magnetometer in a rotating frame of reference configured to provide an input to a controller to control angle-of-attack of the set of blades. In yet another embodiment, the invention provides an improved electrically powered vertical-lift aircraft of the type including at least one rotor having a set of wherein the improvement comprises a set of inertial measurement sensors in a rotating frame of reference configured to provide an input to a controller to control angle-of-attack of the set of blades.

BRIEF DESCRIPTION OF THE DRAWINGS

FIG. 12 is a tabular summary of the calculated performance of an exemplary contra-rotating electric helicopter in accordance with an embodiment of the present invention.

FIG. 14A shows the helicopter with pilot onboard and the canopy closed, while FIG. 14B shows the helicopter without the pilot onboard and the canopy openS

DETAILED DESCRIPTION OF SPECIFIC EMBODIMENTS

Figure 1:
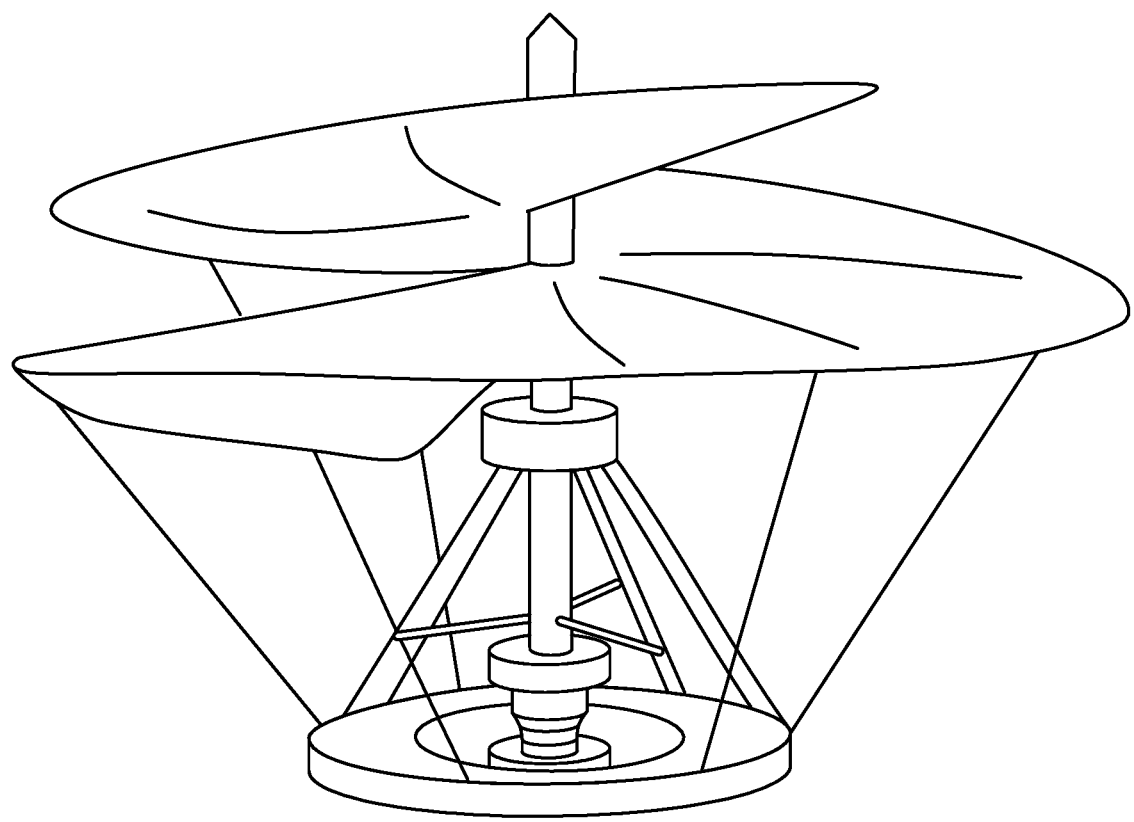
FIG. 1 (prior art) is a sketch from Leonardo da Vinci's notebook, illustrating his conception of the "aerial screw," the first helicopter constructed to carry a human.
Figure 2:
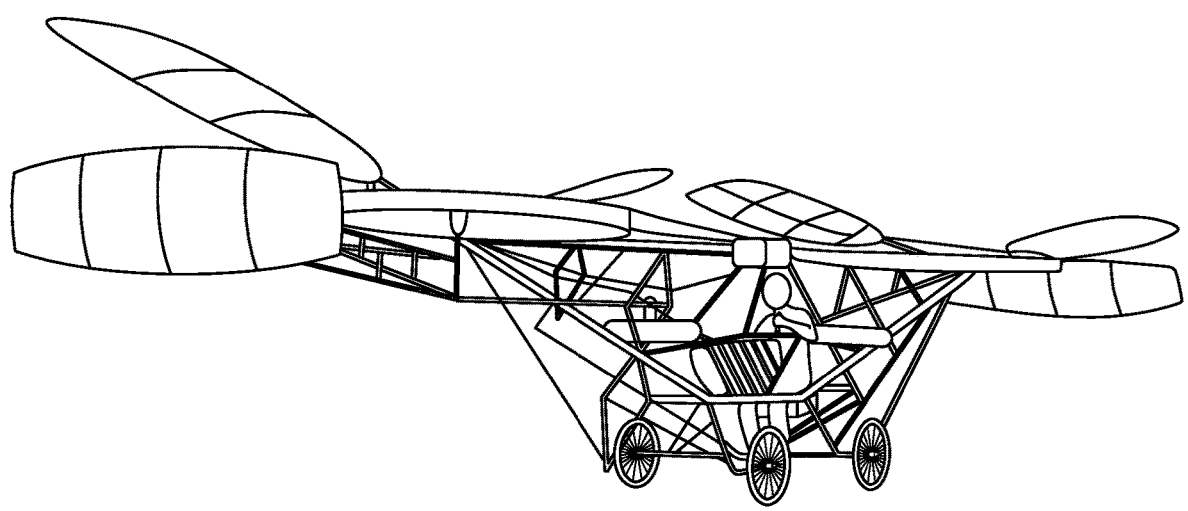
FIG. 2 (prior art) is a photograph of Paul Cornu's Tandem Helicopter, shown with pilot onboard and ready to fly, in 1907.
Figure 3:
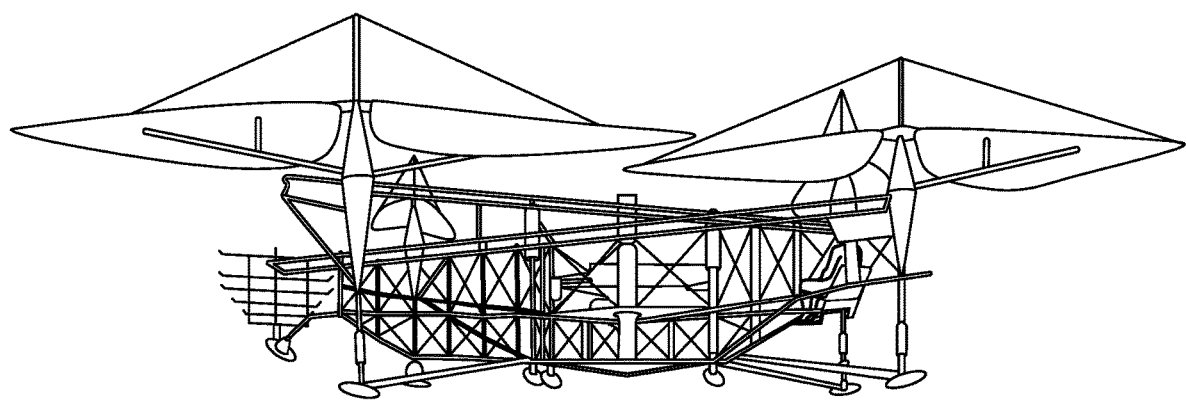
FIG. 3 (prior art) is a photograph of Etienne Oehmichen's Quad-Rotor Helicopter flight, taking flight on May 8, 1924
Figure 4:
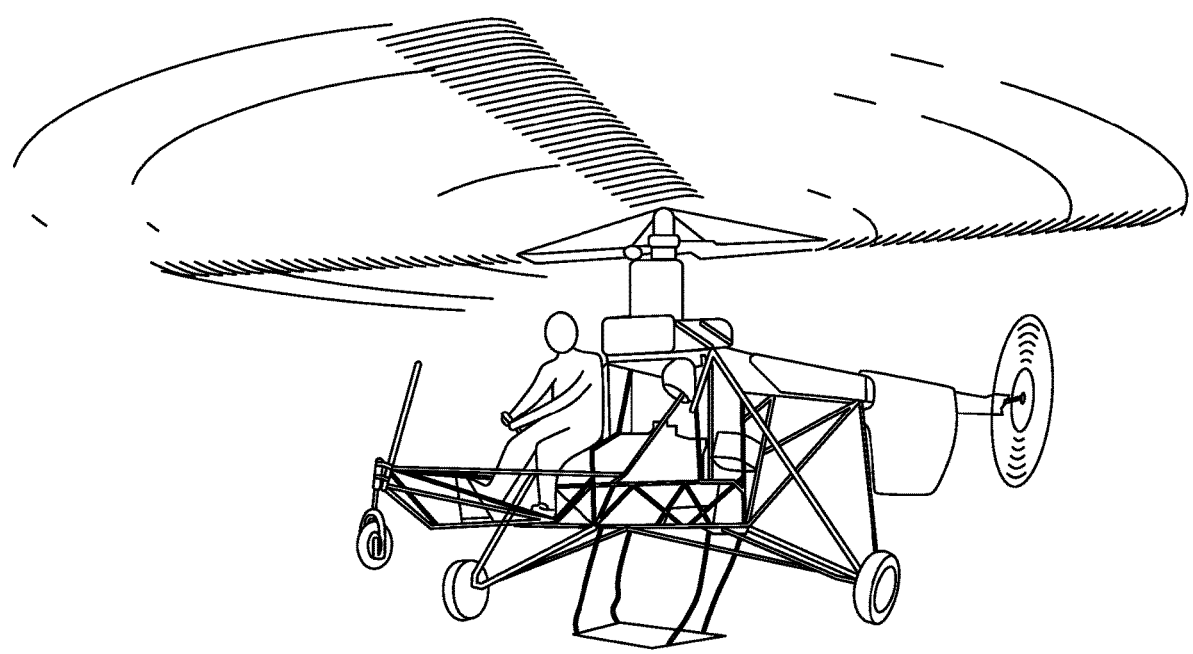
FIG. 4 (prior art) is a photograph of Igor Sikorsky test flying his VS-300 Single-Rotor Helicopter, on Sep. 14, 1939.
Figure 5A:
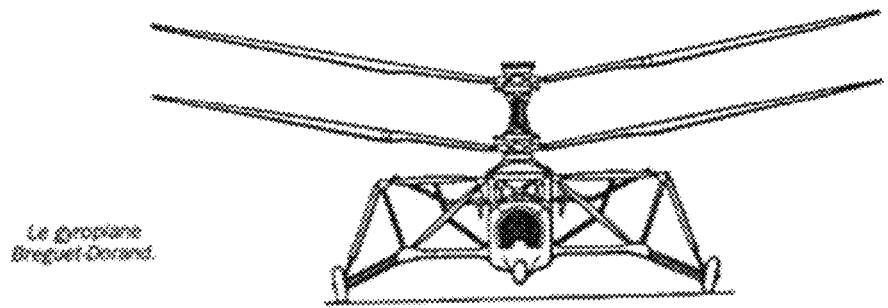
FIGS. 5A, 5B, and 5C (prior art) are line drawings of the Breguet/Dorand Coaxial Helicopter, "Le gyroplane," circa 1933.
Figure 5B:
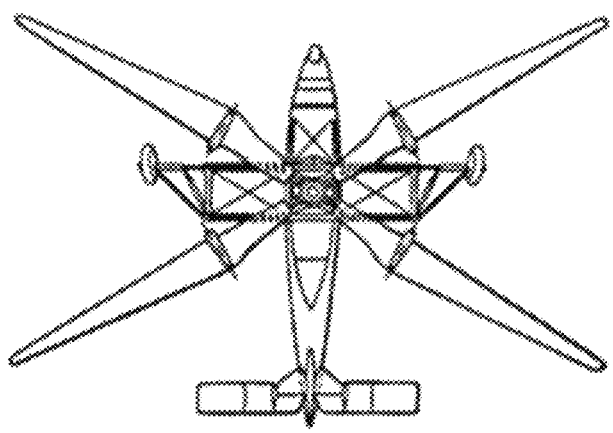
Figure 5C:
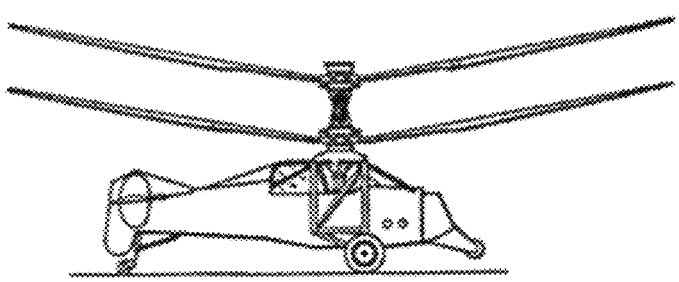

Definitions. As used in this description and the accompanying claims, the following terms shall have the meanings indicated, unless the context otherwise requires:

A "set" includes at least one member.

The benefits of embodiments of the novel contra-rotating electric helicopter disclosed herewith include:
(1) A simple and inexpensive mechanical and electrical design
(2) High reliability derived from said simplicity
(3) Hours of flight time using existing battery technologies
(4) Virtually silent operation Benefits (1) and (2) are inherent with the novel architecture described. However, to achieve the stated benefits (3) and (4), the contra-rotating electric helicopter requires much lower disk loading than normally used for rotorcraft. Disk loading is defined as the weight of the rotorcraft divided by the swept area of the rotor(s). Designing with low disk loading is particularly critical during the current era, wherein commercially available battery energy density is approximately 265 Wh/kg. By comparison, gasoline has an energy density of 12.8 kWh/kg. After accounting for the superior efficiency of electric motors and motor controllers relative to Otto-cycle engines, gasoline powered aircraft currently have a stored energy advantage of 24× to electric aircraft powered by lithium-ion batteries. Such modest battery energy density limits electric aircraft flight times, impacting the market demand relative to similar aircraft powered by fossil fuels. The inventor observes that a reduction in disk loading provides the benefits of increased flight time and reduced noise, whilst reducing the forward speed in flight and making the rotorcraft more sensitive to wind gusts. Such a design trade-off, combined with the novel architecture of the contra-rotating electric helicopter, creates a new class of rotorcraft that the inventor postulates will address applications receiving little attention to date.

The basic equations describing the Power (P) and Thrust (T) of rotorcraft have been known since the 1940s:

$$P = c_P \pi R^2 \rho v_{tip}^3$$

$$T = c_T \pi R^2 \rho v_{tip}^2$$

In hover, $T = W$ $$DL = \frac{W}{\pi R^2}$$

Holding $T$ constant, $$v_{tip} \propto \frac{1}{R}$$

$$P \propto v_{tip}$$

$$\text{Flight Time} \propto \frac{1}{P}$$

$$\text{Flight Time} \propto \frac{1}{v_{tip}}$$

$$\text{Flight Time} \propto R$$

$$\text{Flight Time} \propto DL^{-0.5}$$

For a fixed rotorcraft weight (W), the thrust (T) required for hover must match the weight (W), and the tip speed ($v_{tip}$) of the rotor blades is inversely proportional to the radius (R) of the rotor(s). For a given ratio of tip speed and rotor radius, the power (P) is linearly proportional to the tip speed. Since the rate of power consumption has an inverse relationship with the maximum flight time, the flight time also has an inverse relationship with tip speed. One can therefore conclude that the flight time is linearly proportional to the rotor radius, and inversely proportional to the square root of the disk loading.

For a given blade profile and rotor solidity, the proportionality of rotorcraft noise has been shown to be:

$$\text{Noise} \propto v_{tip}^2 T^2$$

With $T$ held constant, $$\text{Noise} \propto v_{tip}^2$$

$$\text{Noise} \propto \frac{1}{R^2}$$

$$\text{Noise} \propto DL$$

If we express T as a function of tip speed, we see that noise grows with the sixth power of the tip speed. However, holding T constant for the case of a fixed weight rotorcraft in hover, we see that the resulting noise grows as the square of the rotor tip speed. As we noted earlier, the tip speed is in inverse proportion to the rotor radius. Thus, noise scales in inverse proportion to the square of the rotor radius, or directly to the disk loading, DL.

As we have shown, rotorcraft designs with reduced disk loading offer an increase in flight time, while simultaneously reducing noise. Exploiting these advantages, the inventor describes embodiments of the contra-rotating electric helicopter with disk loading in the range of 0.14 lbs/ft^2 and 1.0 lbs/ft^2, which is well below that of commercial helicopters in the range of 2.5 lbs/ft^2 to 10 lbs/ft^2. Comparing two rotorcraft of the same weight, one with a disk loading of 0.14 lbs/ft^2, and the other with a disk loading of 10 lbs/ft^2, the mathematical analysis predicts the rotorcraft with the lower disk loading will offer 8.4× longer flight time and 19 dB/SPL lower noise.

Figure 6:
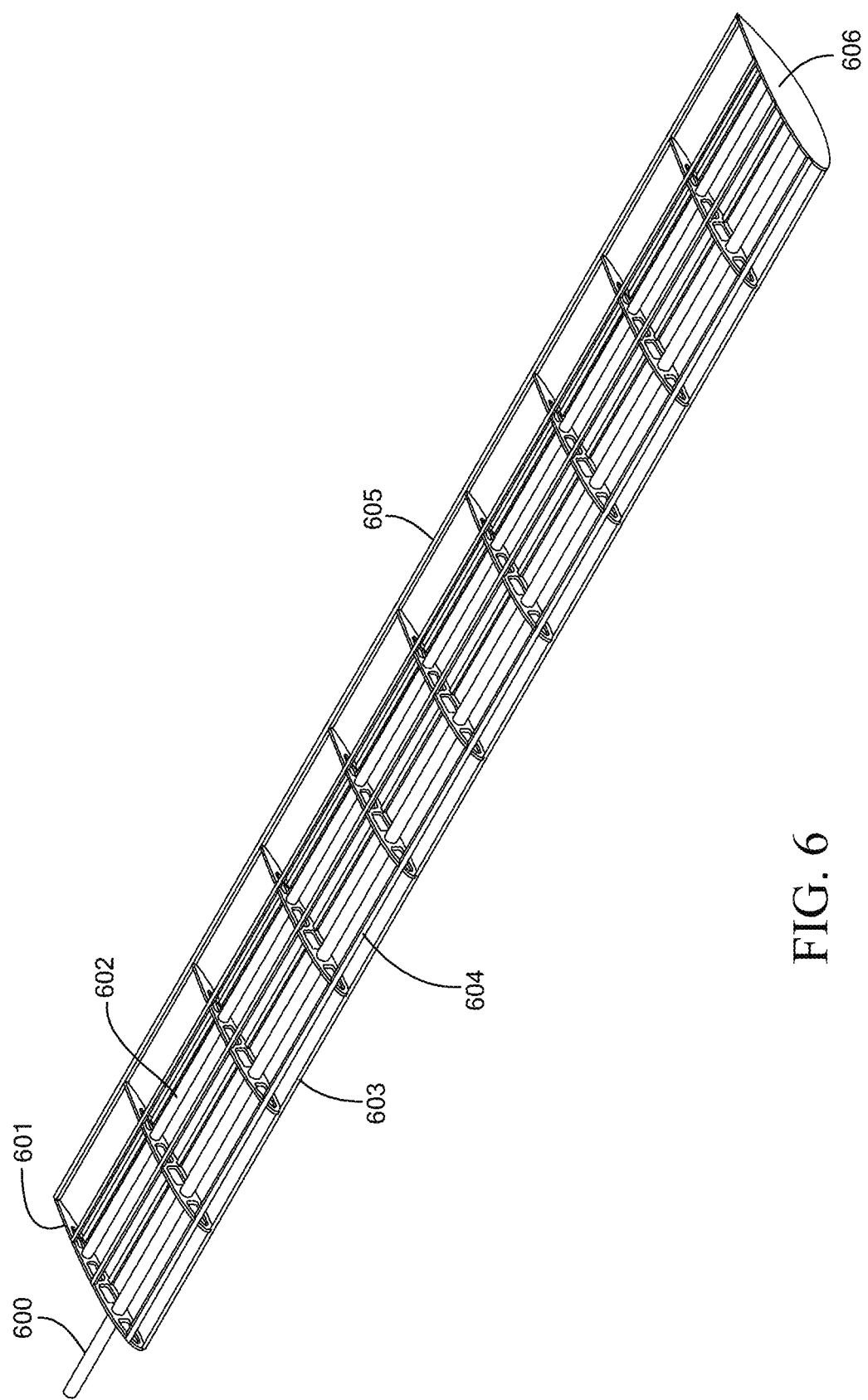
FIG. 6 depicts the space-frame structure of low-mass rotor blades in accordance with an embodiment of the present invention.

With low disk loading, rotor blade construction must accommodate the need for large spans and wide chords, albeit with reduced weight and structural load. Consequently, some embodiments of the present invention employ a space-frame design similar to an airplane wing. FIG. 6 depicts the space-frame structure of low-mass rotor blades in accordance with an embodiment of the present invention. The skeletal frame of these blades is covered with a thin plastic or fabric covering, such as Monokote. FIG. 6 depicts the internal skeletal structure of an exemplary space-frame rotor blade having a constant 162 mm chord, and a 1200 mm span in accordance with an embodiment of the present invention. Ribs 601 with the desired airfoil profile are positioned at regular intervals along the span of the blade. For this embodiment, the eleven identical ribs 601 are machined from PEEK plastic, though other embodiments utilize machined carbon-fiber sheet stock. Strength for the blade is principally derived from the primary spar 600, and the secondary spar 602, both made from carbon fiber tubing. The spars 600, 602, are attached to the ribs 601 with epoxy. Thin and narrow carbon fiber stringers 604, are then glued into the ribs 601. The stringers 604 help support the skin of the airfoil from sagging, though in this instance they also enhance the structural integrity of the wing. The leading edge for the wing 603, is a carbon fiber tube glued to a slot in the leading edge of the ribs 601. The trailing edge 605 is formed with narrow carbon fiber material similar to the stringers 604. An end cap 606 is adhered to the last rib, providing protection for the end of the blade, while improving the aerodynamics.

The completed space-frame structure is skinned with a plastic material such as Monokote, or a fabric material such as Oratex. Both of these materials are specifically designed for model or manned aircraft construction. Once adhered to the frame, an iron or heat gun causes the skin material to shrink, creating a taut surface. The skeletal blades thus become rotating wings, looking less like traditional helicopter blades, which typically have solid construction. Such an approach has been used with success in other helicopters with very low disk loading, such as experimental human-powered helicopters.

For embodiments of the contra-rotating electric helicopter designed with higher disk loading, for example 1.0 pounds-per-square-foot or greater, the rotor blades are constructed using normal methods, such as a carbon fiber skin applied to an inner airfoil shape of lightweight foam. To reduce blade wear during flight, a protective metal leading edge is often applied.

Because the velocity of a rotor blade varies as a function of its position relative to the rotor hub, it has been known since the inception of rotorcraft design that blades with uniform chord and constant pitch-over-span (i.e., no "twist") are sub-optimal. Such blades have greater lift in the outer regions of the rotor, while having excessive spanwise flow due to centripetal force. That said, blades of uniform chord, without twist, are easier to construct, and hence an embodiment is described in connection with FIG. 6 that uses a common airfoil rib throughout the span of the blade, as well as spars of constant diameter and position along the chord. Other embodiments employ optimized blade designs, whereby the chord width, blade pitch, and airfoil profile all change as a function of radial position. Such embodiments improve rotor merit factor by as much as 7% relative to those with uniform blades without twist. Another consideration related to the choice of blade design is noise reduction. Certainly, reducing the tip velocity of the rotor is the primary determinant of noise, which comes naturally with the reduction of disk loading. A surprising physical fact is that rotor noise scales in proportion to the tip velocity to the sixth power. While this is the most critical design parameter, an understanding of the predominant sources of noise can provide insight into more subtle design refinements. For example, a key source of noise is the "blade vortex interaction," which occurs when a rotor blade repeatedly encounters the vortex of the blade that has swept the same area moments earlier. The vortex is caused by the spanwise flow off the end of the rotor blades, though such spanwise flow can be reduced by the application of sweep and anhedral to the outermost portion of the rotor blade shape. For helicopters operating in high-speed forward flight, the application of anhedral is minimized, as this can contribute to excessive aerodynamic drag. However, for some embodiments of the contra-rotating electric helicopter operating at low forward speeds, a substantial amount of anhedral is employed.

While the number of blades and blade area can vary with embodiment, a simple embodiment has two blades with shared cyclic control for the first rotor, and two fixed-pitch blades for the second rotor. Other embodiments can have a greater or lesser number of blades for the first and second rotors, and there is no requirement that both rotors have the same number of blades. The advantage of having a larger number of blades per rotor is the ability to further reduce the rotor tip speed, which results in a further reduction of both rotor noise and mechanical vibration. Disadvantages of increasing the number of blades include increased weight, increased parasitic drag, and increased mechanical complexity in the rotor hubs.

The physics of stacked rotor systems has been thoroughly studied by several research teams over the past century. In comparison to single-rotor helicopters having the same diameter, number of blades, and the same blade chord, contra-rotating helicopters have improved hovering efficiency by virtue of the fact that the lower rotor has increased mass flow compared with the upper rotor. This occurs due to the contraction of the flow of the first rotor, which entrains additional mass flow in an annular region around the perimeter of the lower rotor. While the stacked rotor design improves hovering efficiency, it has the detrimental effect of increased parasitic drag in forward flight, which requires greater total power once the advance ratio typically exceeds 0.15. The trade-off of hovering efficiency and parasitic drag can be somewhat adjusted through the choice of the rotor-to-rotor spacing. A spacing of 19% of the rotor radius has been reported to provide good results, both theoretically and experimentally. Many embodiments of the contra-rotating electric helicopter similarly benefit from such a spacing. For embodiments targeting hovering and slow-speed flight regimes, an increase in the spacing, for example 30% of the rotor radius, provides improved efficiency. For other embodiments intended primarily for high-speed flight, reduced spacing, for example 10% of the rotor radius, provides improved efficiency. An additional consideration for narrow spacing is the avoidance of rotor-to-rotor collisions. Depending upon the articulation of the rotor systems and blade construction, the limiting factor of rotor spacing may be mechanical rather than aerodynamic, as rotor collisions must be avoided as a basic safety principle.

Cyclic control is necessary to stabilize the contra-rotating electric helicopter in hover, and direct it during forward flight. While a traditional swashplate mechanism could achieve such a requirement and is incorporated in some embodiments, the inventor has disclosed a novel and simple cyclic control system ideally suited to many embodiments of the contra-rotating electric helicopter. In my Electric Cyclic Control Application (described above), the inventor describes a rotor system with a shaft shared between two rotor blades on either side of the rotor hub. Through limited-angle rotation of the shared shaft, cyclic control is applied to the feathering axis of the rotor blades. In various embodiments of the contra-rotating electric helicopter, the motor actuating the cyclic control is a stepper motor, limited-angle torque (LAT) motor or a brushless DC (BLDC) motor. In the latter case, the BLDC motor is advantageously powered through Field Oriented Control methods, resulting in an ability to hold the motor drive shaft in an arbitrary angular position.

Some embodiments of the contra-rotating electric helicopter include cyclic control in both the first and second rotor systems. For conventional contra-rotating helicopters, designs typically include collective and cyclic control of both the upper and lower rotors. However, for various embodiments of the novel contra-rotating electric helicopter of the present invention, one observes that the first rotor hub rotates within the frame of reference that advantageously includes the power source and likely the flight control computer, while the second rotor does not include power and other electronics. In embodiments that include cyclic control within the second rotor, a means to transfer power and signal between the first and second rotors is required, such as slip rings or a rotary transformer. As a simplification of the design, some embodiments of the second rotor are passive, having no cyclic control. The authority of the cyclic control is reduced in such embodiments, as the integrated center of thrust for the second rotor remains fixed, relying solely upon a shift in the integrated center of thrust for the first rotor to achieve attitude control. While rare, single-rotor cyclic control has been disclosed and reduced to practice in conventional contra-rotating helicopters. In 2001, Eugene Rock disclosed such a scheme, leading to the issuance of U.S. Pat. No. 6,886,777.

When single-rotor cyclic control is applied to the lower rotor, the interaction with the downwash from the upper rotor must be considered. In the instance of an upper rotor having blades of uniform chord, without twist, the inflow velocity through the upper rotor increases linearly with radial position. The consequence for the lower rotor is reducing the blade angle of attack for the outer portions of the rotor disk, which has the effect of reducing the cyclic authority. In some instances, the cyclic authority may be reduced to an extent that the helicopter cannot transition from hovering into sustained forward flight. To alleviate the issue, the upper rotor blades can be designed with taper, twist, or a combination thereof. The lower rotor blades in fact benefit from uniform chord, as the outer areas of the disk have increased lift relative to the inner areas, increasing the moment applied through the cyclic control.

For embodiments of the contra-rotating electric helicopter of a small scale, for example having a rotor diameter less than 3 meters, the rotor blades can be rigidly attached to the rotor hub, having only articulation along the feathering axis of the rotor blades, as necessary. With the appropriate choice of material and mechanical design, some degree of flexing will naturally occur in the rotation of the blades, relieving stress forces that could otherwise become unsafe. As the scale of the helicopter increases, however, the stress forces exerted upon rigidly attached blades, especially during forward flight, can increase to a degree that could cause structural failure. In traditional helicopter design, a number of mechanical solutions were developed to reduce the stress forces applied to the rotor hub, without severely reducing the rotor lift or cyclic control authority. For a two-bladed rotor, the classic and simple solution is a teetering hinge at the center of the rotor, allowing one blade to flap up, while the other blade flaps down. For example, in forward flight, the advancing blade achieves greater lift than the retreating blade, as a result of the dissymmetry of airspeed over the lifting surfaces. Consequently, with constant rotor blade pitch (neutral cyclic), the advancing blade of a teetering-hinge rotor would cause the advancing side of the rotor disk to lift relative to the retreating side. To moderate the flapping effect, by virtue of the pitch linkages between the blades and the swashplate, the angle-of-attack for the advancing blade is automatically reduced as the blade flaps upward, while the angle-of-attack for the retreating blade automatically increased as it flaps downward. The mechanical coupling of the flapping angle with blade incidence is commonly known as "Delta-3," named by rotorcraft pioneer Juan de la Cierva. More complex approaches to helicopter rotor design include fully articulated rotors, allowing individual blades to lead-and-lag, moving in the plane of rotation, while also flapping up-and-down. Articulation of the blades in the third axis of movement, the feathering axis, allows collective and cyclic input. Modern helicopters often have semi-rigid rotor heads, whereby flexures are carefully engineered to allow movement in the lead-lag and flapping axes, while maintaining control through the feathering axis. Various embodiments of the novel contra-rotating electric helicopter in accordance with the present invention incorporate rotors that employ each of the aforementioned mechanisms.

The rotating frame of reference for the cyclic control and flight control computer poses the unique challenge of synchronizing the cyclic response with the position of the rotor, lacking a fixed frame of reference afforded by a fuselage in many embodiments. In one embodiment of the contra-rotating electric helicopter, the flight control computer relies upon the input of a magnetometer within the same rotating frame, which senses magnetic field variation in the plane perpendicular to the axis of rotation. As one can rely upon the ever-present magnetic field of the earth, the magnetometer provides a sinusoidal response as a function of angular position, and hence serves as the source of synchronization information for the flight control computer implementing the required cyclic response. In the past, inertial sensors and magnetometers were large, heavy and expensive. Today, an inertial measurement unit with 6-axes of inertial sensing and 3-axes of magnetic sensing are available in a single MEMS-based chip that are integrated onboard the flight control computer. The entire flight control computer with 9-axis IMU typically costs less than US$200.

Using the 3-axis magnetometer periodicity about the Z-axis to synchronize the cyclic sinusoidal response provides a straightforward and cost-effective means of controlling the contra-rotating electric helicopter. However, there are potential situations that could cause this scheme to fail, including:
 (1) failure of the magnetometer;
 (2) unintentional magnetic interference; and
 (3) intentional magnetic interference.

In such instances, other mechanisms can in some embodiments serve as back-up source of synchronization, and in other embodiments serve as the primary source of synchronization. To account for the first situation, some embodiments have a second magnetometer addresses the risk of failure, as the compound likelihood of two magnetometers failing simultaneously is very low. To account for the second and third situations, some embodiments incorporate other sensors including visible-light cameras, infrared cameras, LIDAR, or RADAR. In such embodiments, a repeating pattern of imagery provided by one or more such sensors rotating in the same rotating frame as the first rotor provides information to determine orientation relative to the ground, presuming the contra-rotating electric helicopter has distinct ground references, such as varied terrain, buildings and vegetation. Other benefits of incorporating such sensors include the ability to capture and interpret the imagery for surveillance, photography or mapping, as examples.

The novel architecture of the contra-rotating electric helicopter in accordance with embodiments of the present invention poses the unique circumstance of having two rotating frames of reference, with no necessary fixed frame of reference relative to the ground. As mentioned in the Summary, applications such as mapping do not necessarily require a fixed frame of reference, potentially benefiting from the continual panning of the horizon from the perspective of a centrally mounted sensor array. Since embodiments lacking a fixed frame of reference are the simplest to construct, we shall describe in detail variations of such an embodiment, having a total mass of approximately 3.6 kg, and a disk loading of approximately 0.14 lbs/ft^2. We will then consider five embodiments that create a stationary frame of reference through different means:
 (1) Including a swivel at the base of the contra-rotating electric helicopter, along the axis of rotation of the first and second rotors, and attaching the swivel through a rope or similar means, to an object in a stationary frame of reference.
 (2) Including a swivel at the base of the contra-rotating electric helicopter, attaching a fuselage below the swivel, and attaching an aerodynamically designed fin at the rear of the fuselage, such that the fuselage becomes naturally aligned with the forward direction of travel.

(3) As an elaboration on (2), allowing the fin to be articulated about a forward-backward axis such that the downdraft from the rotors moves the fuselage to a desired azimuthal orientation while in a hovering state.

(4) Including a gimbal-type motor at the base of the contra-rotating electric helicopter, along the axis of rotation of the first and second rotors, and connecting a rotating frame of reference to a fuselage frame having arbitrary azimuthal orientation.

(5) Including a gimbal-type motor/generator in the fuselage, along with a tail fin to align the fuselage during forward flight. Such configuration allows the gimbal motor to orient the azimuth of the fuselage during hover and slow-speed flight, while serving as a generator to recharge the local battery in the fuselage frame during high-speed flight.

Figure 7A:
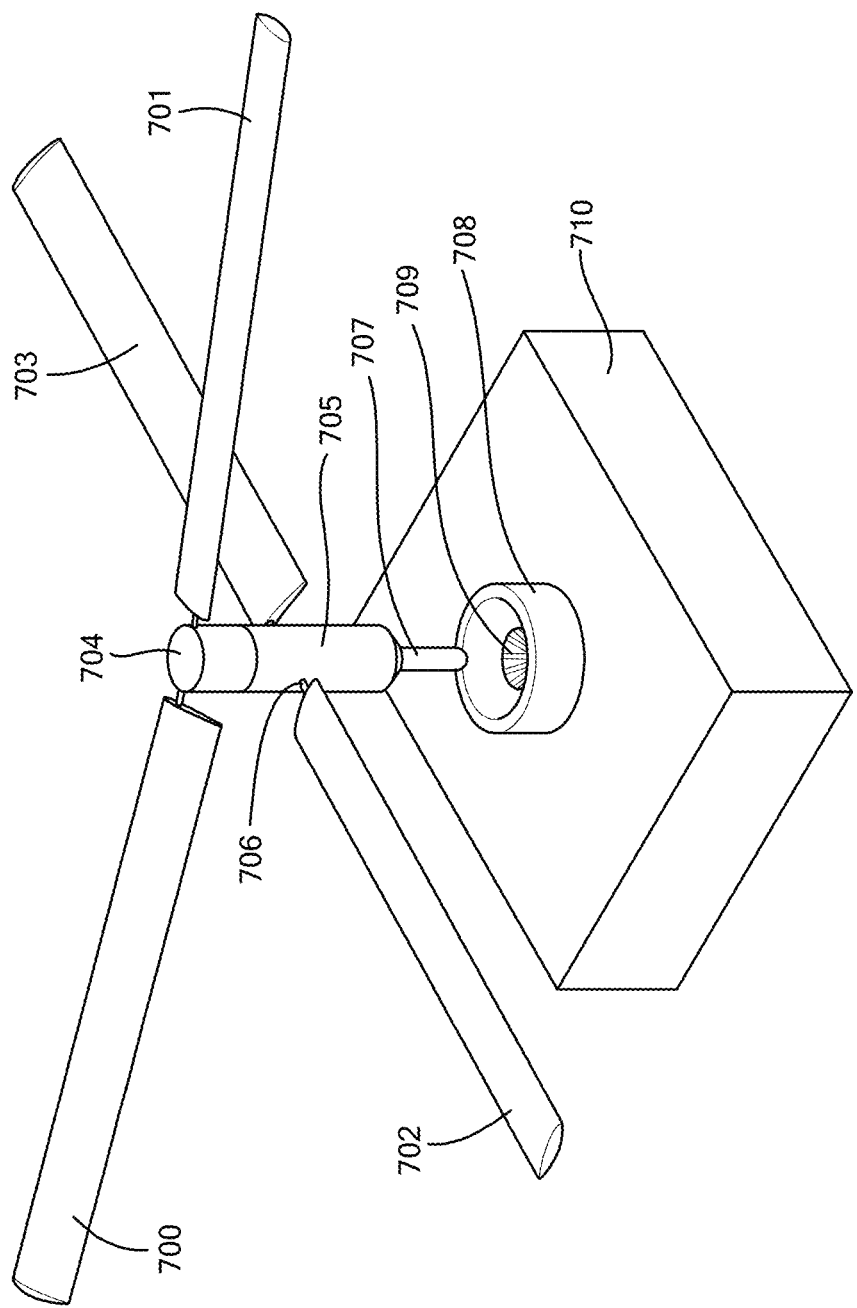
FIG. 7A is an isometric view of an exemplary contra-rotating electric helicopter, hovering over the launch base, in accordance with an embodiment of the present invention

FIG. 7A is an isometric view of an exemplary contra-rotating electric helicopter, hovering over the launch base, in accordance with an embodiment of the present invention. FIG. 7A illustrates an embodiment of the contra-rotating electric helicopter of the present invention, without a fixed frame of reference. The first rotor includes rotor blades 702 and 703, articulated for cyclic control through the shared shaft 706. Within the central cylinder 705, all electrical components, drive motor, cyclic motor, and battery module are included. At the base of the central cylinder, a landing post 707 projects downward. In flight, the blades 702 and 703, along with the central cylinder 705 and landing post 707 spin in counter-clockwise rotation. The second rotor, the upper rotor in this instance, includes the rotor hub 704, with rotor blades 700 and 701. In contra-rotation with the first rotor, the second rotor spins in a clockwise direction. The choice of which rotor spins in which direction is completely arbitrary, as it has no effect on the aerodynamic performance.

The exemplary embodiment shown in FIG. 7A is unmanned, intended to operate as an autonomous vehicle from a terrestrial base of operations. To allow free contra-rotation of the upper and lower portions of the helicopter, the takeoff and landing base includes a set of roller bearings 709, wherein the conical portion of the helicopter base nests against the bearings when in a landed position. The landing post 707 at the bottom of the helicopter fits within a tube of the take-off and landing base 708, preventing the helicopter from tipping over when not in operation. Upon the application of power to the drive motor of the helicopter, the upper and lower rotors begin to spin in contra-rotation, balancing the aerodynamic drag and friction forces to achieve a natural equilibrium. As sufficient power is applied such that the combined thrust of the upper and lower rotors exceeds the weight of the helicopter, the helicopter will gradually rise from the base 710, sliding vertically until the bottom of the landing post 707 clears the conical section 708 of the take-off and landing base 710. Referencing inertial sensors onboard the helicopter, the flight computer applies the necessary cyclic response to control the ascent of the helicopter, preventing unsafe lateral movement until well clear of the take-off and landing base.

Figure 7B:
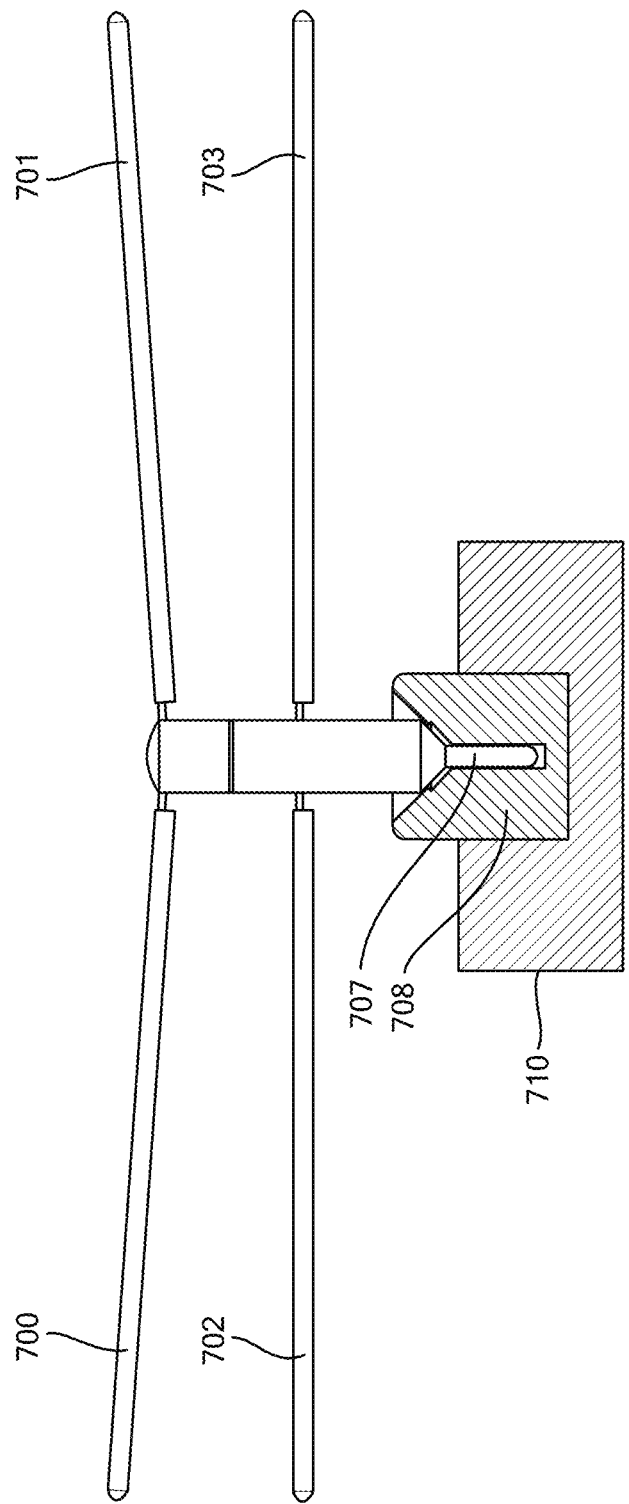
FIG. 7B is a side view of the exemplary contra-rotating electric helicopter of FIG. 7A and a cross-sectional view of the launch base in accordance with an embodiment of the present invention.

FIG. 7B is a side view of the exemplary contra-rotating electric helicopter of FIG. 1 and cross-sectional view of the launch base in accordance with an embodiment of the present invention. The landing base 710, illustrated in the FIG. 7B cross section, is specifically designed to accommodate landings of the exemplary contra-rotating electric helicopter. Using navigation methods such as augmented GPS, radar and video, a landing procedure begins by positioning the helicopter directly above the conical portion of the base. In slowly reducing rotor thrust to less than the weight of the helicopter, the aircraft will descend toward the landing base. Depending upon wind conditions, the axis of rotation for the helicopter may not be aligned with the vertical orientation of the orifice within the conical section 708. However, the wide angle of the conical section 708 allows the helicopter control system to place the landing post 707 at the opening to the vertical orifice in 708. Once laterally confining the landing post 707, the helicopter control system can then apply cyclic to bring the axis of rotation vertical, since the force exerted by the wind can no longer cause lateral movement of the helicopter. Once the axis of rotation is essentially vertical, the helicopter controls reduce drive motor power, allowing the landing post 707 to drop into the orifice in section 708. In a fully descended position, the base of the helicopter comes to rest upon the roller bearings 709 in the conical section 708, which thus begin to spin. The spinning motion of the roller bearings 709 prevent excessive wear to the based of the helicopter, which would otherwise occur through repeated takeoffs and landings. Once the helicopter rests upon the roller bearings 709, rotor power is terminated, and personnel can approach the aircraft once the rotors have come to a stop. Ground operations, such as recharging of the helicopter batteries, can then commence.

The process of taking off during windy conditions follows a similar sequence, though in reverse. Upon the initiation of motor power, the rotors begin to turn in contra-rotation. In the early phase of takeoff, the reaching a point when the lift exceeds the helicopter weight, and the helicopter begins to rise from the launch base 710. When the bottom on the landing post 707 approaches the top of the orifice in section 708, the helicopter begins to lean away from the direction of the incoming wind. The autonomous control of the helicopter then applies a counteracting cyclic response, causing the helicopter to lean into the wind. Once the wind force acting laterally upon the helicopter has been neutralized, the helicopter control system applies additional thrust to the drive motor such that it rises above the launch base 710. When executed correctly, there is minimal lateral movement of the helicopter during ascent.

Figure 8:
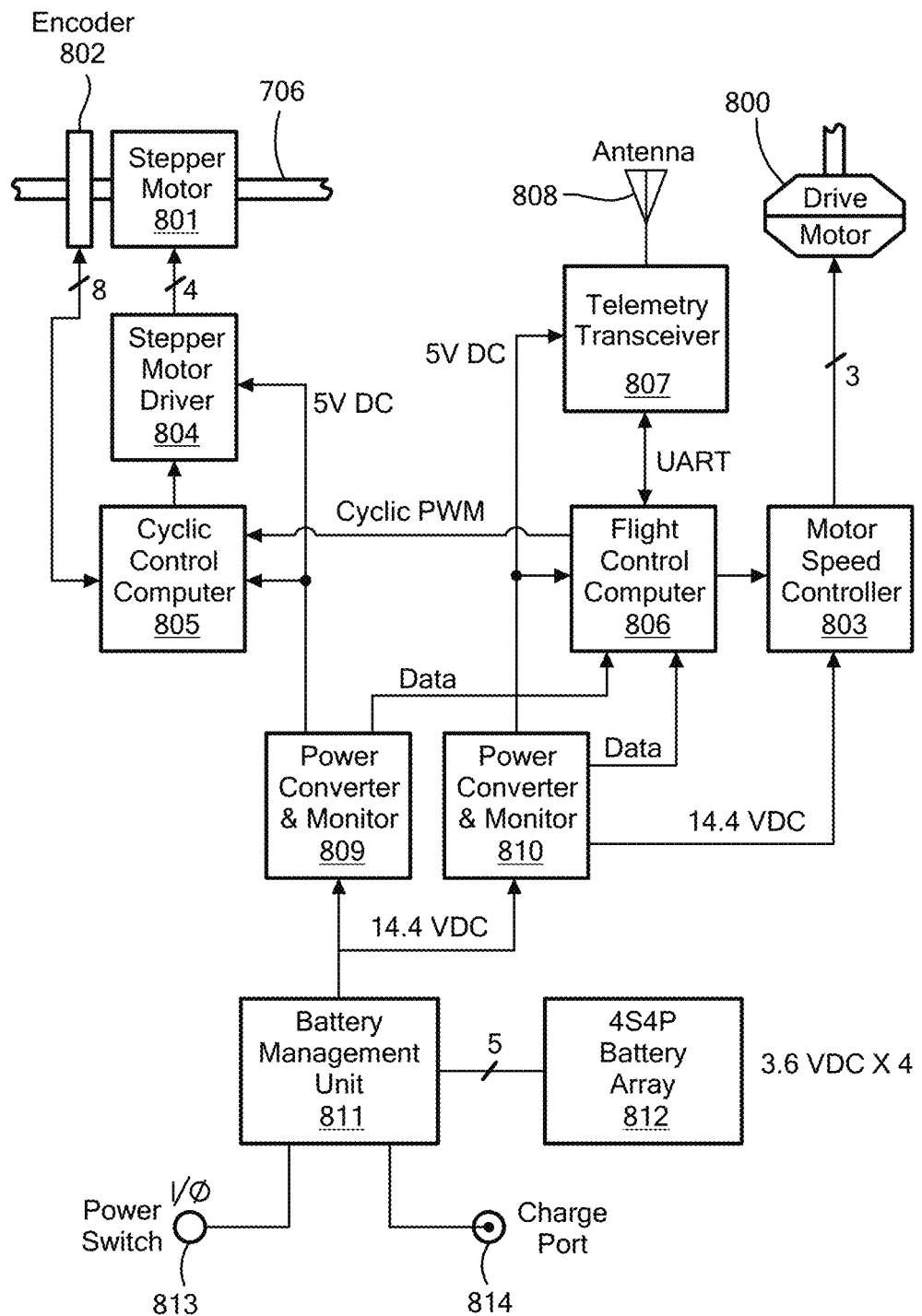
FIG. 8 is an illustrative electrical block diagram of major subsystems within the embodiment of the contra-rotating electric helicopter of FIG. 7A in accordance with an embodiment of the present invention.

FIG. 8 is an illustrative electrical block diagram of major subsystems within the embodiment of the contra-rotating electric helicopter illustrated in FIG. 7A. The exemplary helicopter is powered by an array of 16 lithium-ion batteries 812, arranged as four cells in series, and four cells in parallel, producing a nominal potential of 14.4 volts. A battery management unit 811 provides critical safety functions, such as preventing over charging, over discharging, and maintaining cell voltage balance. In this illustrative embodiment, the charging process occurs though the manual connection of an external charger to the charge port 814. The power switch 813 is moved to the "off" position for charging, removing power from the helicopter circuits, while coupling the battery array 812 to the charge port 814, through the supervision of battery management unit 811. Once charging is complete, the charger is removed from charge port 814, and the power switch 813 is returned to the "on" position.

With power switch 813 in the "on" position, power conversion and monitoring circuits 809 and 810 produce 5 volts, required to power the computers 805 and 806, transceiver 807 and stepper motor driver 804, while sensing current flow and providing this data to the flight control computer 806. The flight control computer 806 serves as the brain of the helicopter. While some embodiments operate fully autonomously, others receive commands from ground-based operations, using for example an onboard 900 MHz telemetry transceiver 807 and antenna 808. Like many modern flight control computers, some embodiments of the flight control computer 806 include an accelerometer, gyroscope, and magnetometer within a single chip, with three-axes of data for each sub-system.

The flight control computer 806 utilizes various sensor inputs to determine the drive motor 800 speed or torque, and the cyclic shaft 706 angle. The drive motor 800 speed causes a monotonic increase in the integrated rotor thrust. The flight control computer 806 signals changes in thrust by periodic commands to the motor speed controller 803, which produces a change in the commutation voltages driving motor 800. Many embodiments of the contra-rotating electric helicopter emulate a classic swashplate, whereby the angular motion of the cyclic motor 801 follows a sinusoidal rhythm. In these cases, the flight control computer 806 computes a cyclic phase angle and a cyclic amplitude. As the azimuthal position of the first rotor changes, flight control computer 806 commands a changing cyclic shaft 706 angle through a PWM signal to cyclic control computer 805. The cyclic control computer 805 remains aware of the cyclic shaft 706 angle through feedback from encoder 802. From the current state of the cyclic shaft 706 angle, the cyclic control computer 805 determines the movement required to achieve the commanded position from flight control computer 806, signaling to stepper motor driver 804 the necessary number of steps or fractional steps required of stepper motor 801.

Some embodiments of the flight control computer 806 use the Z-axis magnetometer sensor to synchronize the cyclic response to the azimuthal orientation of the helicopter. By analyzing the output signal from the magnetometer sensor at regular intervals, the flight control computer 806 determines the orientation of the first (lower) rotor, which advantageously includes the cyclic mechanism. Determining the acceleration of the rotorcraft relative to the fixed frame of reference requires a first step of rotating the instantaneous acceleration measurements to account for the instantaneous orientation and angular acceleration of the rotorcraft. With rotorcraft acceleration estimates relative to azimuthal orientation and altitude, the flight control computer 806 computes the required cyclic response and main drive motor 800 throttle, to achieve attitude control. For a sinusoidal cyclic response, the shaft 706 movement is described by an amplitude and a phase, as mentioned above. The phase in this case is a reference orientation within the azimuthal plane, such as magnetic North. In some embodiments, the cyclic response is periodic but not strictly sinusoidal, and in some such embodiments is encoded as the amplitude and phase of each of several harmonics. The main drive motor 800 throttle is simply a scalar value that translates to a required angular velocity and power. As with other electrically-powered rotorcraft, many embodiments of the contra-rotating electric helicopter will utilize proportional-integral-derivative (PID) control methods. An excellent source of information regarding the tuning of the PID controls of several prior-art rotorcraft configurations can be found on the website: https://ardupilot.org/copter/docs/traditional-helicopter-tuning.html Tuning of the flight control firmware requires knowledge of the physics of the rotorcraft, and of the rotor system in particular. Traditional swashplate control requires a desired cyclic input to occur almost 90 degrees prior to the corresponding maximum blade pitch response, compensating for the effects of gyroscopic precession of the spinning rotor system. For a single-rotor helicopter, advancement of cyclic input is with respect to the direction of rotation. Gyroscopic precession is the result of angular momentum, and one must consider that angular momentum is a vector quantity, having both a magnitude and direction. The direction of angular momentum is the axis of rotation, though it can point in either direction of the axis, depending upon the direction of rotation. With the contra-rotating electric helicopter, however, we have what appears to be a cancellation of the angular momentum. If the angular momentum of the first and second rotor systems were identical, one might conclude that the phase lag would be eliminated, as the combined angular momentum of two identical rotors in contra-rotation at identical rotational speeds would cancel. In practice, realized embodiments of the contra-rotating electric helicopter will tend to have greater angular momentum in the first rotor, which includes the additional mass of the motor base and power source, presuming the aerodynamic and mechanical design achieves approximately equal and opposite rotational speed for the first and second rotors. Depending upon the disparity of the angular momentums and other details of the rotor system design, many embodiments of the contra-rotating electric helicopter will require a cyclic input to be applied 70 to 90 degrees in advance of the desired location of blade pitch response, with respect to the direction of rotation of the first rotor.

Figure 9:
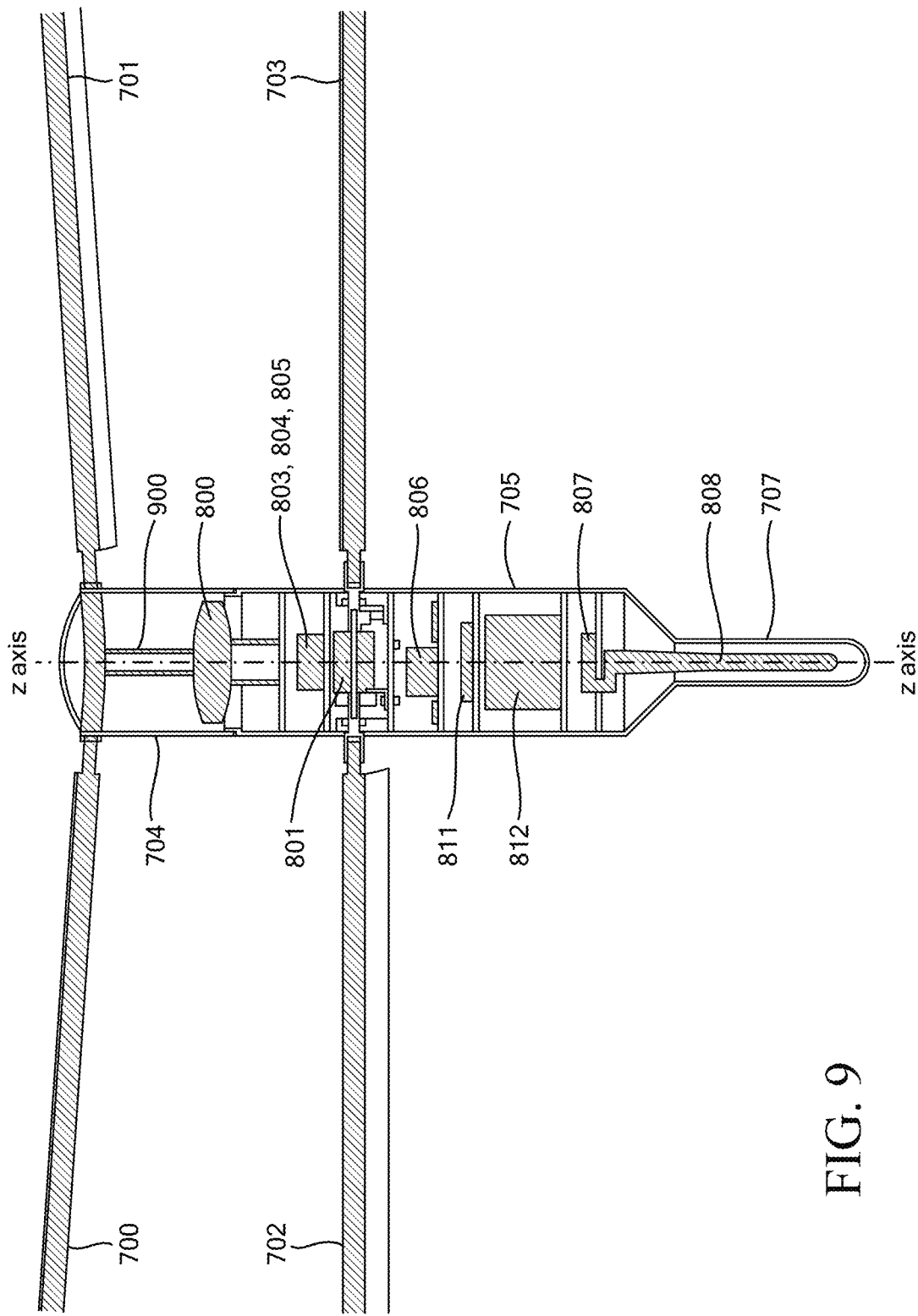
FIG. 9 is a view of a vertical section of a contra-rotating electric helicopter in in FIG. 7A illustrating placement of subsystems therein.

FIG. 9 is a cross-sectional view of the exemplary contra-rotating electric helicopter in FIG. 7A, illustrating placement of subsystems therein. One of the goals of the mechanical layout is to achieve a mass distribution such that the axis of rotation is as close as possible to the axis Z-Z through the center of the rotor hub, orthogonal to the plane of rotation. With such a mass distribution, the rotor hub 704 and central cylinder 705 will spin without wobbling and introducing undesirable mechanical stress. To simplify the design exercise, the inventor attempts to place the center of gravity for each vertical section of the helicopter as close as possible to the axis through the center of the rotor hub, orthogonal to the plane of rotation. In the launch peg 707, at the base of the helicopter, the vertical dipole antenna 808 for the telemetry transceiver 807 is advantageously mounted. Because the antenna pattern for a vertical dipole antenna 808 is uniform over azimuth, the antenna gain does not significantly vary as the lower section of the contra-rotating electric helicopter rotates. Mounted above the telemetry transceiver 807 is the array of lithium-ion batteries 812 that power the helicopter. The location of the battery array 812 low in the helicopter helps to improve flight stability by positioning the center of gravity as far below the center of thrust as possible. With the center of gravity below the center of thrust, increasing the distance between the two points increases the stabilizing torque acting upon the rotorcraft. For this embodiment of the contra-rotating electric helicopter, a stepper motor with dual axles serves as the cyclic motor 801. Avoiding the complexity of rotor hub hinges and flexures, the shafts for each blade 702 and 703 in the lower rotor are coplanar. Above the first rotor with cyclic control, the main drive motor 800 is mounted. This motor includes vertical mounting spacers 900, forming a lightweight driveshaft, such that the total distance between the upper and lower rotors is approximately 19% of the rotor radius. The upper rotor is passive for this embodiment. Without the need to articulate the two rotor blades 700 and 701 about their feathering axis, the upper rotor includes 2.5-degrees of coning angle, another feature to improve flight stability, while reducing the possibility of rotor-to-rotor collisions.

Figure 10:
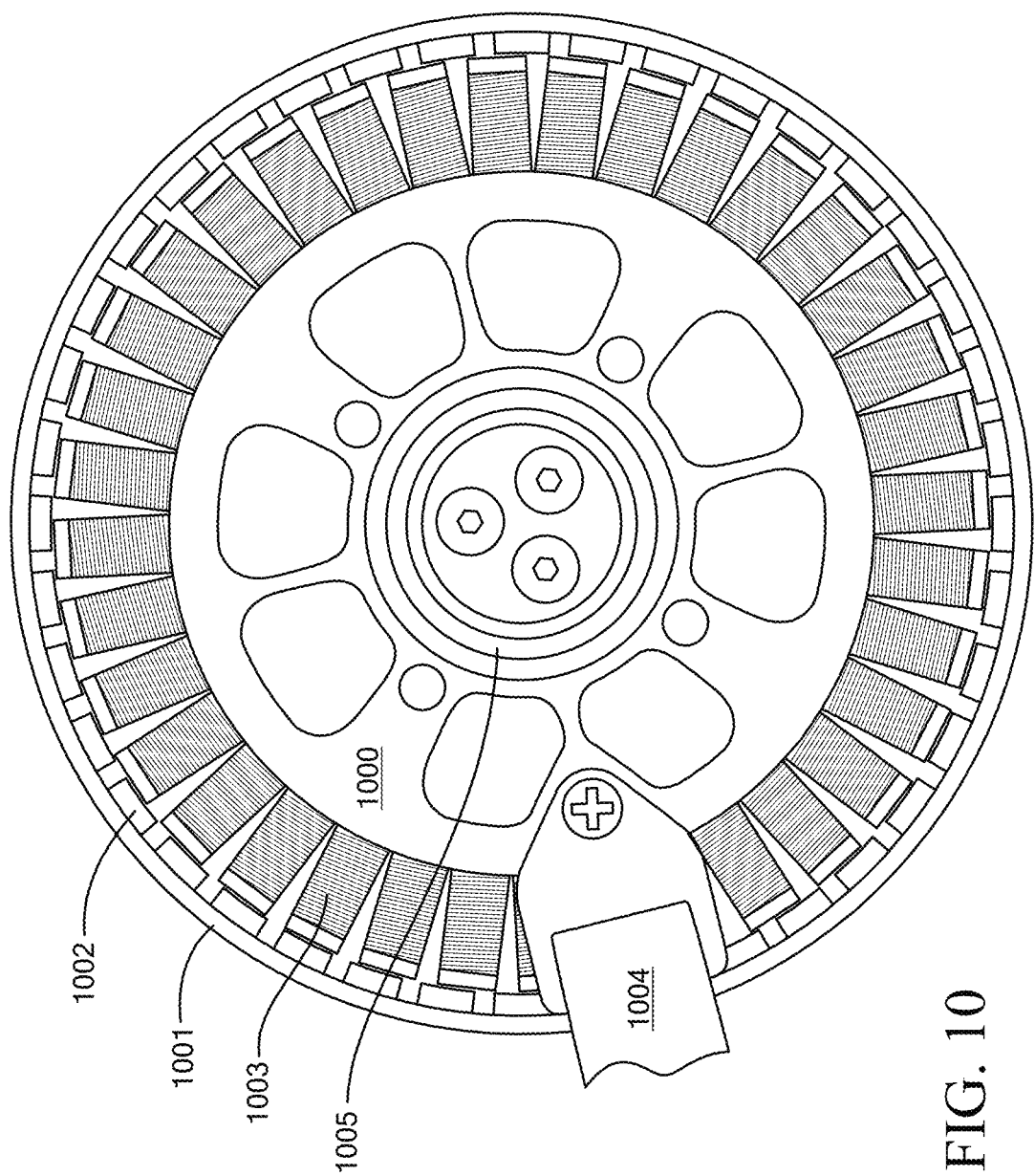
FIG. 10 is an axial view of an exemplary outrunner BLDC motor (here with with 36 armature coils and 42 permanent magnets) such as that suitable for drive motor 800 of FIGS. 8 and 9, in accordance with an embodiment of the present invention.

FIG. 10 is an axial view of an exemplary direct-drive BLDC motor, such as that suitable for drive motor 800, shown in FIGS. 8 and 9, in accordance with an embodiment of the present invention. This BLDC motor operates as an "outrunner," meaning that the hub 1001, containing the magnets 1002, rotates about the stationary windings 1003 of the inner stator 1000. The windings 1003 are connected to form three phases, with the power cable 1004 exiting the stator 1000 on the lefthand side. To support direct-drive applications, the bearing 1005 is designed for both radial and axial loads. This particular motor has a 36N42P configuration, meaning that it includes 36 wire wound poles (N), and 42 permanent magnet poles (P). The ratio is derived from the popular 12N14P DLRK (Distributed—Lucas, Retzbach and Kuhfuss) configuration, offering high torque with smooth and quiet operation. The large number of poles translates to a low motor speed constant of 90 Kv (zero load angular speed of 90 revolutions per minute, per volt applied). The low motor speed constant makes this particular direct-drive motor well suited for the exemplary embodiment, as it can operate at a low RPM with adequate torque.

The choice of whether to incorporate a gear-reduction mechanism between the output shaft of the electric drive motor and the attachment to the second rotor depends upon the rotor diameter and disk loading (aircraft weight per swept rotor area) of a particular embodiment. Johnson and Silva, NASA Ames, analyzed the tradeoff for eVTOL designs by considering the power density as a function of rotor diameter. With a typical eVTOL rotor tip speed of 550 feet-per-second (Mach 0.5), they found that any rotor system larger than 4 feet in diameter could be reduced in weight with gear reduction, considering the tradeoff of the additional weight of the gear reduction mechanism versus the reduction in motor weight afforded through an increase in motor angular velocity. An additional consideration that Johnson and Silva did not analyze was the efficiency of an electric motor operating with or without gear reduction. As part of the development of contra-rotating electric helicopter embodiments, the inventor studied this particular issue with significant results.

Multiple embodiments of the contra-rotating electric helicopter have a rotor diameter of 8.7 feet, and a disk loading of approximately 0.14 lbs./ft^2. As described in the preceding paragraphs, an embodiment of the contra-rotating electric helicopter utilizes the direct-drive motor shown in FIG. 10. With only the rotor of the motor as a moving part, direct-drive designs are desirable for their simplicity, low noise, and high reliability. Having concerns for total mass and electrical efficiency, however, the inventor analyzed embodiments utilizing geared motors. The direct drive motor was compared with a derivative of a 6:1 gear-reduced BLDC robotic actuator, invented by Benjamin Katz at MIT in 2018. The outrunner BLDC motor in FIG. 10 is intended for large quad-copter and multi-copter drone applications, with direct drive to fixed-pitch rotors. In contrast, the Katz gear-reduced actuator is specifically designed for robotic applications, combining a motor, planetary gearbox, motor driver, control computer and CAN-bus interface in a compact package. These actuators emerged as an enabling technology in recent research demonstrating robotic power and agility similar to animals, such as the MIT "Mini Cheetah" project.

Figure 11:
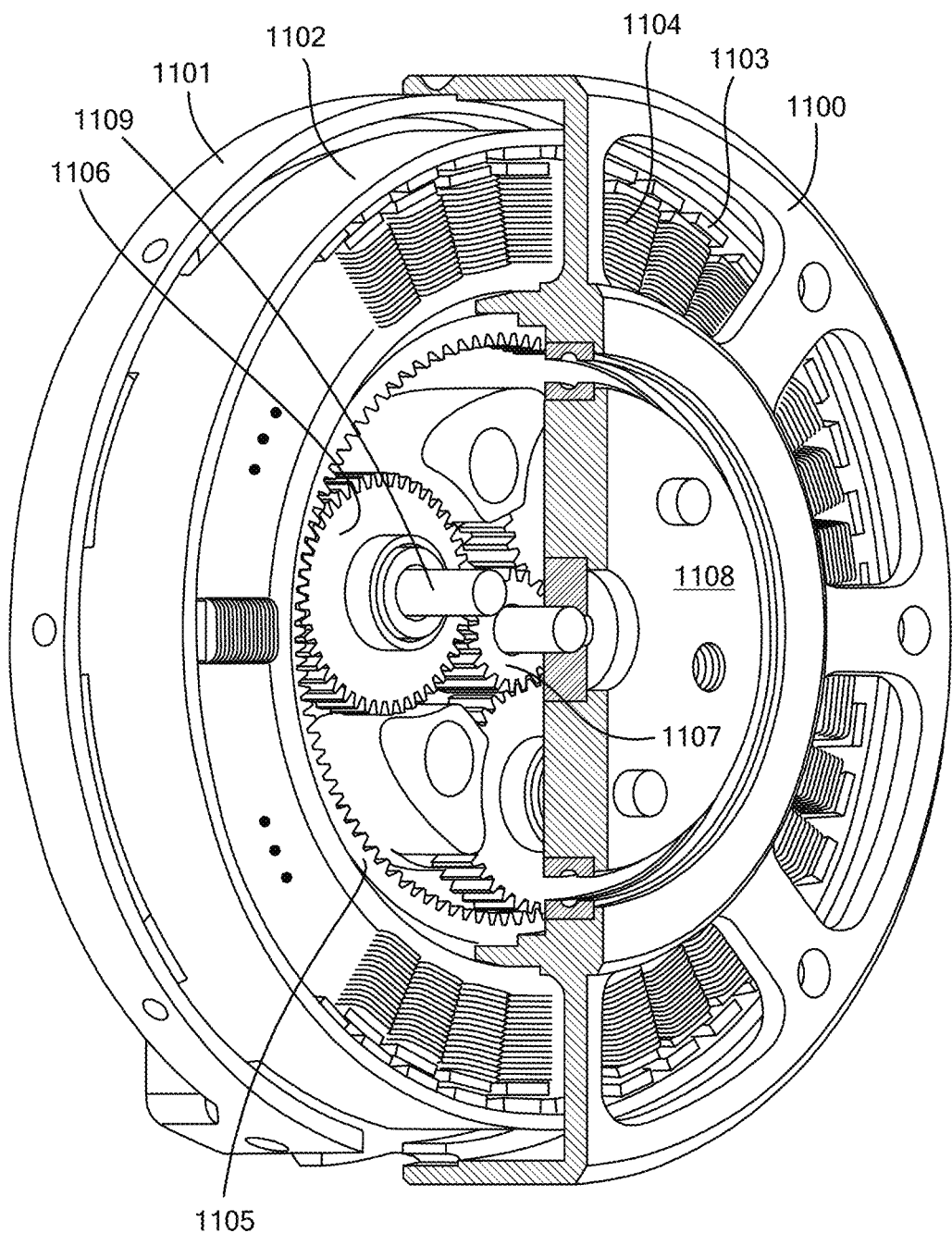
FIG. 11 is a perspective cut-away view of a robotic actuator combining an outrunner motor, planetary gearbox, motor controller, and central processor with CAN-bus interface in accordance with an embodiment of the present invention.

FIG. 11 is a perspective cut-away view of a robotic actuator combining an outrunner motor, planetary gearbox, motor controller, and central processor with CAN-bus interface, in accordance with an embodiment of the present invention. In this case, FIG. 11 is the actuator described in Katz' Masters Thesis. The prototype actuator was developed by modifying an off-the-shelf BLDC motor, inserting a planetary gearbox in the central volume normally occupied by the stator support structure. The case of the actuator includes the front cover 1100, and the back cover 1101. The rotor 1102 has 42 permanent magnets 1103 mounted around the periphery. The stator has 36 wire wound poles 1104. As with the prior example in FIG. 10, the motor configuration is a multiple of the popular DLRK configuration. The ring gear 1105 is affixed to the front cover 1100, remaining stationary, while the sun gear 1107 and planet gears 1106 turn. The rotor 1102 is attached to the sun gear 1107, which drive the planet gears 1106. The output pins 1109, at the center of the planet gears 1106, cause the planet carrier 1108 to turn. The actuator output is the external surface of the planet carrier 1108.

Jiangxi Xintuo Enterprise Co., Ltd, a Chinese component manufacturer doing business as "CubeMars," licensed the design of the Katz actuator from MIT, and they began producing a line of actuators based upon this architecture. The particular actuator utilized in the exemplary embodiment is the AK60-6 KV140 model. The BLDC motor inside this actuator operates with a rated speed of 2400 RPM, limited by the internal 24V motor speed controller, which translates to an output speed of 400 RPM. With the rated torque of 3 Nm, the actuator has a power density of 395 W/kg (0.24 hp/lb). Though the power density is modest compared with other modern BLDC motors, the actuator includes the motor driver, gear reduction, processor and CAN-bus interface. By comparison, the higher speed BLDC motor in FIG. 10 offers an incredible power density of 3.6 kW/kW (2.2 hp/lb), more than 9 times greater than the actuator in FIG. 11. Upon cursory examination, one might conclude that the direct-drive motor from FIG. 10 is the obvious motor of choice. However, the exemplary embodiment of the contra-rotating helicopter requires high torque at low rotor speed, which skews the results in a surprising way.

The direct-drive BLDC outrunner motor in FIG. 10 has a mass of 280 g, and requires an electronic speed control module with an additional mass of 63 g, for a combined mass of 343 g. This motor operates with an efficiency of 52% in the helicopter embodiment, requiring 44% of the stalled-motor torque to allow hovering. The inventor took note that this torque is far beyond the highest operating efficiency torque, which occurs at 12.6% of the stalled-motor torque. The actuator in FIG. 11 has a mass of 315 g, and operates at an efficiency of 72% in the helicopter embodiment, including the loss from the gear reduction mechanism. With the benefit of gear reduction, the actuator operates at 7.6% of the stalled-motor torque, which is close to the highest efficiency torque setting of 11.7% of the stalled-motor torque.

As Johnson and Silva's analysis would suggest, the exemplary 8.7-foot rotor system indeed benefits from a weight perspective using a gear-reduced motor, shaving 8% off the combined motor and drive mass. More striking, however, is the improvement in motor efficiency, jumping from 52% to 72%, an increase of 38%. The flight time of the contra-rotating electric helicopter can thus improve by 39%, with most of the gain resulting from improved motor efficiency. The impact of the mass reduction is negligible, since the electric motor and drive are less than 10% of the total rotorcraft mass. Thus observed, while an electric motor has a virtually constant torque capability as a function of angular velocity, it is important to operate the motor near its point of optimal efficiency, else precious flight time will be lost to heating within the motor.

Utilizing the AK60-6 actuator as the drive motor, a refined embodiment of the contra-rotating electric helicopter, without a fixed frame of reference, is analyzed in FIG. 12, which is a tabular summary of the calculated performance of an exemplary contra-rotating electric helicopter in accordance with an embodiment of the present invention. The batteries are presumed to have the currently available lithium-ion energy density of 265 Wh/kg. Designed with a disk loading of 0.14 lbs/ft^2, and a battery module mass equal to 39% of the total helicopter mass, the exemplary embodiment has a hovering flight endurance of 2.6 hours, and a cruising flight endurance of 3.7 hours at 12 mph. In comparison, the commercially successful DJI Mavic 2 Pro quad-copter drone, with a battery module mass fraction of 33%, has a maximum hovering time of 29 minutes, and a maximum flight time of 31 minutes.

Figure 13:
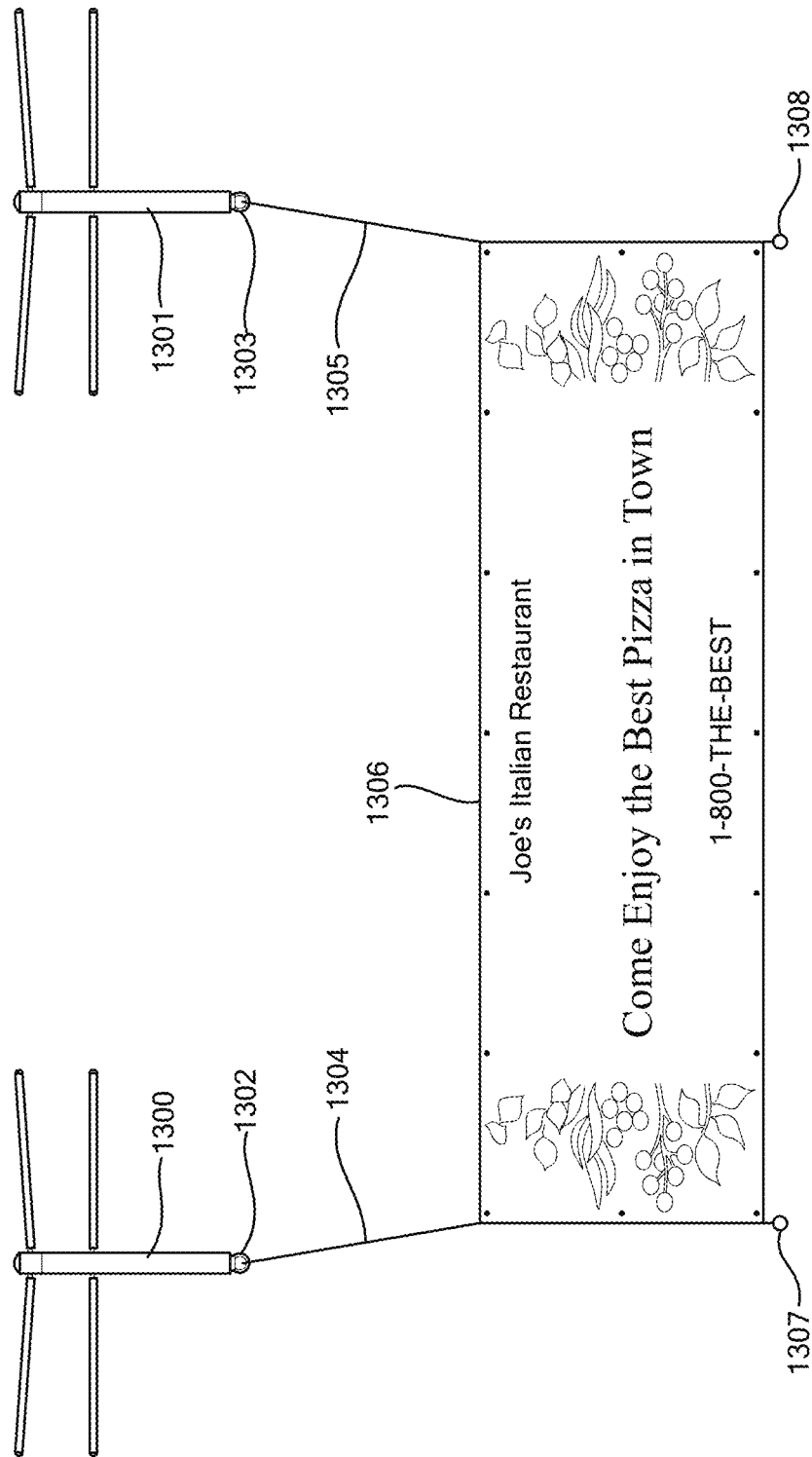
FIG. 13 is a perspective view showing a pair of exemplary contra-rotating electric helicopters, each with a swivel joint at the base, configured to support an aerial advertisement banner, in accordance with an embodiment of the present invention.

Having considered embodiments of the contra-rotating electric helicopter without a fixed frame of reference, we now turn our attention to five different architectures to augment the basic design of the contra-rotating electric helicopter with a fixed frame of reference. The first of these embodiments is exemplified in FIG. 13, which is a perspective view showing a pair of exemplary contra-rotating electric helicopters, each with a swivel joint at the base, configured to support an aerial advertisement banner, in accordance with an embodiment of the present invention. A potentially profitable application for the contra-rotating electric helicopter is aerial advertising. Traditionally, aerial advertising involves pulling a banner behind an airplane or helicopter, or a branded airship which may include animated lighting displays. In all cases, the aircraft are manned by human pilots, and the total operating costs are substantial relative to the advertising revenue generated. By replacing a human-piloted aircraft with autonomous aircraft having lower operating costs, the contra-rotating electric helicopter offers the opportunity to both expand the profitability and overall market size for aerial advertising. Moreover, the low noise signature for the contra-rotating electric helicopter allows the aircraft to fly at lower altitudes, improving advertising visibility and enabling micro-targeting of advertising messages. In FIG. 13, the pair of contra-rotating electric helicopters 1300 and 1301 may, as an example, hold the banner 1306 in a fixed position over a large public gathering, hovering for an extended period of time. While the lower and upper rotors of each helicopter continue to spin in contra-rotation throughout flight, the exemplary embodiment includes passive swivel joints 1302 and 1303 at the base of each helicopter. These swivel joints include ball-bearings arranged in a manner allowing the joint to spin freely, even under the load of the tethers 1304 and 1305, the suspended banner 1306, and the banner weights 1307 and 1308. Because the banner 1306 is held taut by a slightly outward cyclic response of the helicopter pair, the swivel joints 1302 and 1303 tends to remain in a stationary position relative to the banner 1306. Thus, FIG. 13 illustrates a case of creating a stationary frame of reference by attaching a swivel joint to a fixed object.

Figure 14A:
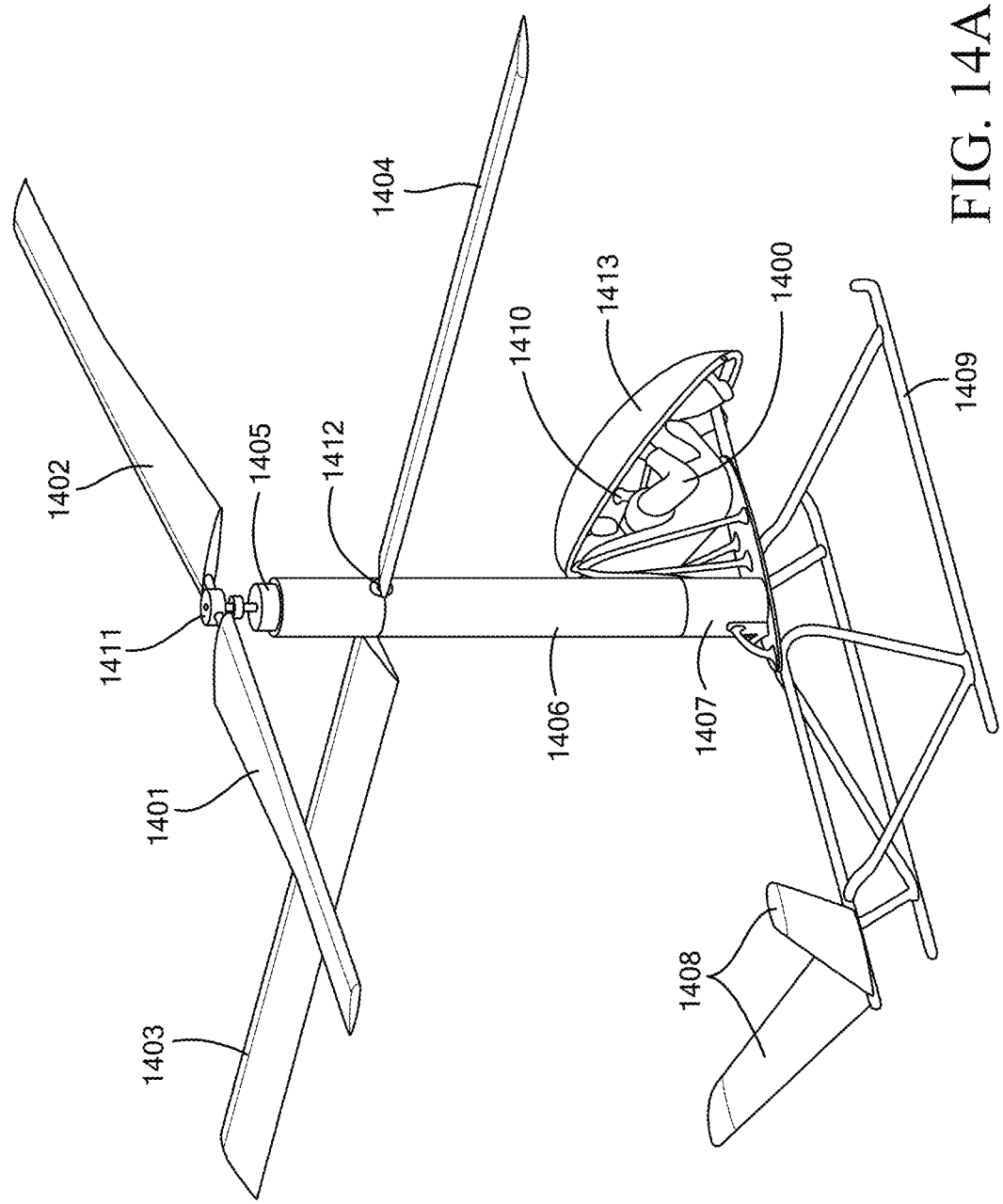
FIGS. 14A and 14B illustrate an exemplary FAA Part 103 ultralight contra-rotating electric helicopter, including rotory bearing and stabilizer fin, allowing the fuselage to remain forward facing during flight in accordance with an embodiment of the present invention.
Figure 14B:
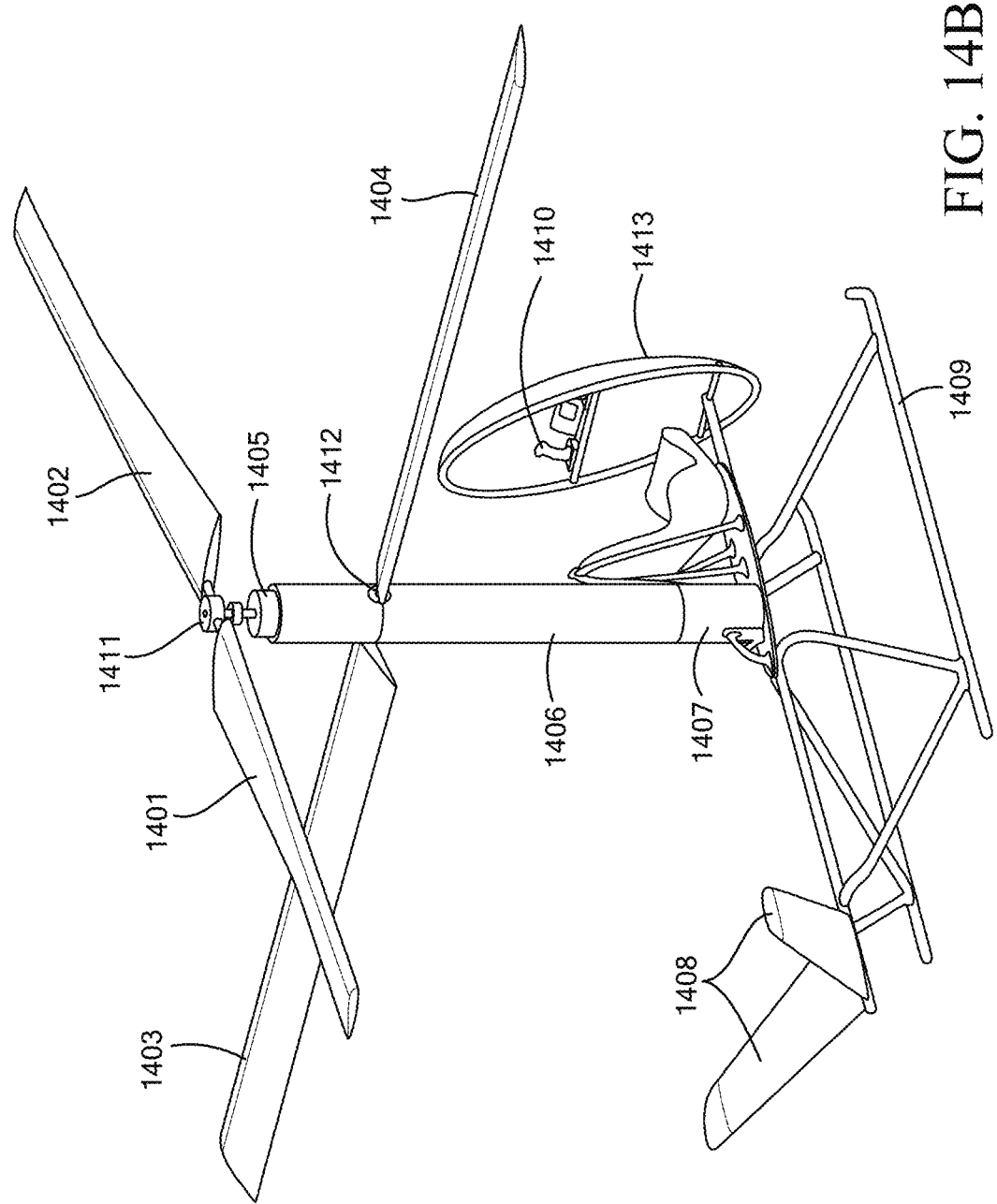

FIGS. 14A and 14B illustrate an exemplary FAA Part 103 ultralight contra-rotating electric helicopter, including rotory bearing and stabilizer fin, allowing the fuselage to remain forward facing during flight, in accordance with an embodiment of the present invention. This embodiment satisfies the US FAA 14 CFR Part 103 requirements as a single-person piloted ultralight aircraft. FIG. 14A illustrates the contra-rotating helicopter with a pilot 1400 onboard, and the canopy 1413 closed for flight. FIG. 14B illustrates the contra-rotating helicopter without the pilot onboard, and with the canopy 1413 open. As shown, the flight controls and instrument cluster are attached to the canopy 1413, easing the pilot ingress and egress. The total empty weight of the exemplary embodiment is 240 pounds, slightly less than the regulatory limit of 254 pounds. Within the lower portion of central cylinder 1406, a battery module composed of lithium-ion batteries, with a total weight of 120 pounds, serves as the power source. As with previously described embodiments, cyclic control is applied to the lower rotor, with blades 1403 and 1404 sharing a common cyclic shaft 1412, while the upper rotor hub 1411, coupled with blades 1401 and 1402, is passive. Both rotors have a diameter of 23.7 feet. For analysis, the pilot 1400 is presumed to weigh 200 pounds. Thus, the exemplary embodiment has a disk loading of 1.0 pounds-per-square-foot. Designed to achieve a rotor merit factor of 80%, the resulting hover power is 10.8 kW. With a cruise speed of 36 mph (55 knots maximum speed limit, per US FAA Part 103), the exemplary helicopter can sustain flight for 74 minutes, covering a distance of 44 miles.

The upper rotor, composed of rotor blades 1401 and 1402, turns in a counter-clockwise direction, powered by electric drive motor 1405. As previously described, this embodiment of the contra-rotating electric helicopter adopts a tapered planform for the upper rotor blades, as this reduces the detrimental effect of the downwash on cyclic authority provided by the lower rotor. The lower rotor, which includes the central cylinder 1406, turns in clockwise direction, driven by the counter-torque coupled through the base of electric drive motor 1405. The lower rotor blades 1403 and 1404 are designed with a constant chord, in contrast to the tapered planform of the upper rotor blades.

As with prior embodiments, all components necessary to produce thrust and cyclic control are contained within the rotating central cylinder 1406. These components include the main drive motor 1405, cyclic mechanism, motor drivers, flight control computer, power management sub-systems, and battery modules. A short-range wireless link is established between a telemetry transceiver in 1406 and a telemetry transceiver contained within the fuselage central section 1407. An auxiliary battery system within 1407 provides the power for the flight controls, including throttle 1410, onboard avionics, short-range telemetry transceiver, running lights, and other electronics. The pilot 1400 has flight controls, which are coupled to the electronics within 1407, relaying the commands to the flight control computer contained with the central cylinder 1406.

At the base of the central cylinder 1406, the embodiment in FIGS. 14A and 14B includes a passive swivel joint, coupling the central cylinder 1406 with the fuselage central section 1407. The swivel joint is designed with a pair of conical roller bearings, similar to the wheel of an automobile, which allows it to support both lateral and axial loads, with minimal friction and wear. Thus, while the fuselage central section 1407 and coupled fuselage components are supported by the thrust produced by the rotor systems, the fuselage can rotate freely around the axis of the bearing, aligning itself based upon a combination of the aerodynamic and gravity forces acting upon it.

The center of gravity for the contra-rotating electric helicopter in FIG. 14A is set forward of the central cylinder 1406, influenced by the weight of the pilot 1400. During the takeoff phase of flight, cyclic must be applied, increasing the thrust on the forward portion of the rotor disk, to allow the helicopter to achieve a stable hovering condition. As the cyclic moves toward a neutral position, the helicopter begins to pitch forward, due to the moment of the center-of-gravity.

Pitching forward causes the rotors to produce a forward thrust, in addition to vertical lift, and the helicopter begins to transition from a hovering state to forward flight. During the early transition to forward flight, the front of the rotor disks experience greater lift than the rear portion of the disks, owing to a higher angle of attack for the rotors passing through air without an induced vertical velocity. Depending upon the center of gravity and other conditions, the middle portion of transition to forward flight may require cyclic from the rear of the disk. Eventually, the entire rotor disk is receiving fresh air, and the thrust efficiency improves relative to hovering flight. With the advantageous position of the center-of-gravity, the attitude of the helicopter at the cruising speed reaches a trimmed condition with minimal fore-aft cyclic.

The V-tail 1408 serves two aerodynamic purposes. The projected vertical surfaces align the fuselage with respect to the direction of flight. While the forward position of the center of gravity provides a natural alignment, the V-tail greatly augments this effect. To the extent that the fuselage wanders in azimuth (yaw), the V-tail 1408 experiences a lateral force, which creates a moment to bring the overall fuselage back into alignment with the forward air velocity. The second purpose of the V-tail 1408 is to prevent undue pitching during cruising flight, lessening the need for continual cyclic stabilization. In this instance, the projected horizontal surfaces have an incidence angle chosen to align with the required fuselage pitch angle at the cruising speed. To the extent that the pitching angle differs from the aligned direction of the projected horizontal tail surfaces, an aerodynamic force and resulting moment tend to adjust the pitch attitude as necessary. Thus, the V-tail 1408 provides forward flight stabilization, both in yaw and pitch.

With the goal of minimizing the fuselage weight, while maximizing its strength, the frame of the fuselage is constructed from carbon fiber tubing, such as the skid 1409. The carbon fiber is joined with epoxy to anodized aluminum junctions. Windshield 1413 is constructed of thin polycarbonate, strengthened with a carbon fiber frame around the perimeter. With weight as a critical factor, the ultralight Part 103 helicopter embodiment in FIGS. 14A and 14B does not include other covered surfaces.

The upper rotor hub 1411 embodies innovations described by the inventor in his previous "Rotor System for Electrically Powered Rotorcraft," referenced above. These innovations include a spring actuated mechanism which reduces the incidence angle of rotor blades 1401 and 1402, when the applied torque of electric drive motor 1405 drops below a threshold value. This automatic mechanism ensures that the contra-rotating electric helicopter will immediately enter a state of autorotative descent upon the loss of power from electric drive motor 1405. In the absence of such a mechanism, rotor blades 1401 and 1402, having a nominal operating incidence angle of 12 degrees, would not sustain autorotation, as the driving portion of the rotor disk would generate insufficient power to balance the power consumed by the driven portion, resulting in a catastrophic loss of rotor speed and lift.

The upper rotor hub 1411 couples with rotor blades 1401 and 1402 through a teetering hinge, said hinge vertically offset to account for the preconing angle of 2.5 degrees. The incidence angles of the blades 1401 and 1402 are adjusted through linkages that couple both the teetering (flapping) angle and the aforementioned spring actuated mechanism. The coupling of the teetering angle, commonly known as Delta-3, results in the incidence angle of the lifted blade being reduced, while the incidence angle of the lowered blade being increased. Concurrently, the spring actuated mechanism reduces the blade incidence of both blades by approximately 12 degrees upon a loss of drive power from electric motor 1405. Thus, whether the blades have the nominal operating incidence angle of 12 degrees, or the nominal autorotative incidence angle of 0 degrees, the Delta-3 coupling remains effective.

The Delta-3 coupling of upper rotor hub 1411 has the effect of reducing the dissymmetry of lift during forward flight, as the lift of the advancing side of the rotor becomes less pronounced relative to the lift of the retreating side. For single-rotor helicopters, Delta-3 is an essential requirement. For the contra-rotating electric helicopter depicted in FIGS. 14A and 14B, the advancing side of the upper rotor is on the right, while the advancing side of the lower rotor is on the left, effectively balancing the dissymmetry of lift in forward flight. As published research has shown, operating with "lift offset" in a contra-rotating helicopter actually improves the rotor efficiency. However, the improved efficiency comes with a price, namely a pronounced increase in vibration, and a risk of mechanical failure. Hence, the application of Delta-3 for the contra-rotating electric helicopter is applied judiciously to moderate the effects of vibration and stress, while achieving greater rotor efficiency than possible with a single-rotor helicopter of the same diameter.

We now turn our attention to the third case of creating a fixed fuselage frame of reference, cited earlier. Consider a variant to the embodiment depicted in FIGS. 14A and 14B, replacing the V-tail 1408 with a single vertical tail, and an electric motor to articulate said tail about the fore-to-aft axis of the connecting shaft. During hover, the rotor system produces an average induced velocity of 10 mph, increasing with radial position. At the location of the stabilizing tail, the velocity of the vertical column of air reaches 14 mph. In a hovering state without wind, there is negligible flow of air over a vertically-disposed tail in the horizontal plane. However, when the tail is articulated to a position other than vertical, the flow of air can apply sufficient force to rotate the fuselage in azimuth. The concept of using downdraft on a tiltable tail for yaw control is not new. In fact, it was first disclosed by Nolan, resulting in the issuance of U.S. Pat. No. 5,791,592, on Aug. 11, 1998. As applied to the novel contra-rotating electric helicopter, it provides a simple means to control the azimuthal orientation of the fuselage while in hover.

Figure 15A:
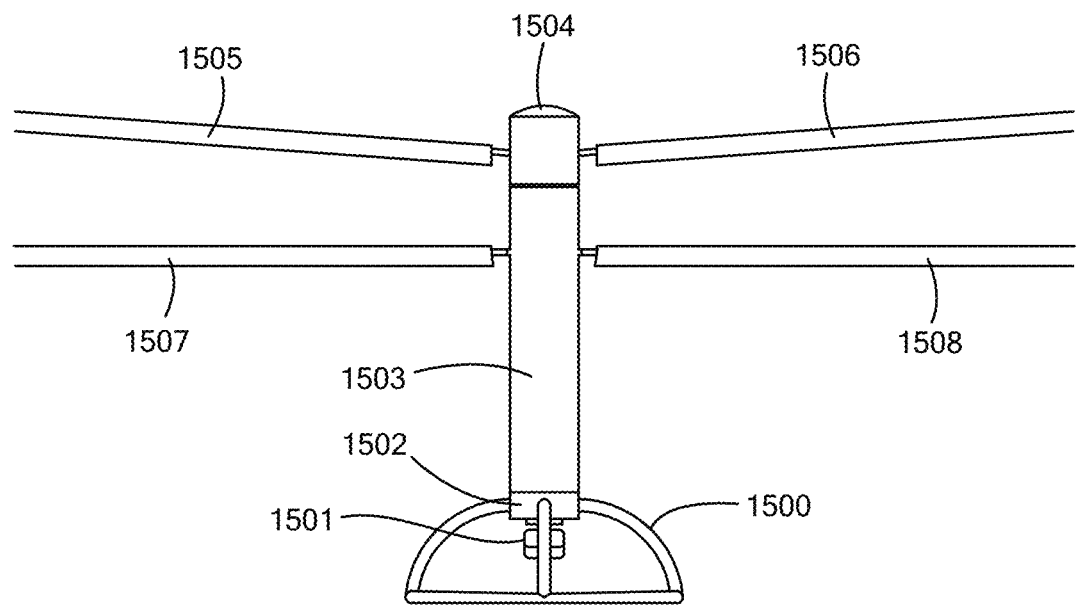
FIGS. 15A and 15B are side and isometric views respectively of an exemplary contra-rotating electric helicopter with electric gimbal motor (establishing a stationary camera platform), and landing base, in accordance with an embodiment of the present invention.
Figure 15B:
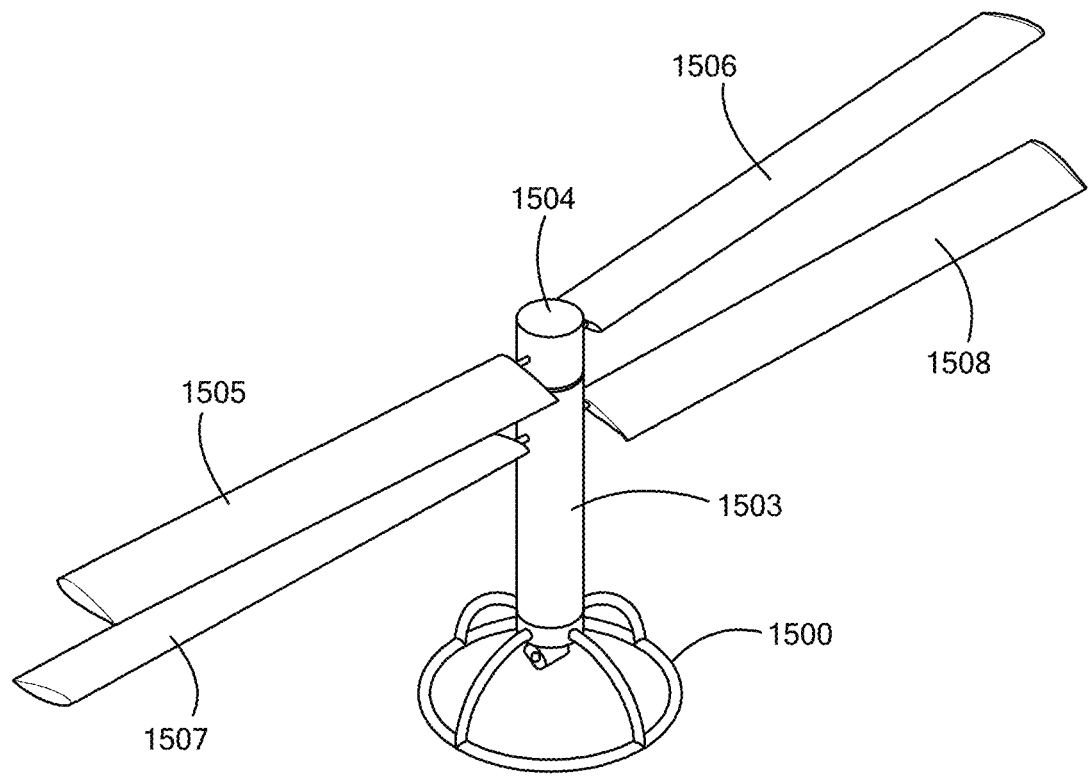

FIGS. 15A and 15B are side and isometric views, respectively, of an exemplary contra-rotating electric helicopter with electric gimbal motor (establishing a stationary camera platform), and landing base, in accordance with an embodiment of the present invention. Here we consider a fourth architecture to achieve a fixed fuselage frame of reference for the contra-rotating electric helicopter. The depicted embodiment includes an upper rotor hub 1504, with rotor blades 1505 and 1506. The lower rotor section 1503 is coupled with rotor blades 1507 and 1508. In this instance, the exemplary embodiment resembles the embodiment of FIGS. 7A and 7B, though now including a base frame 1500 with base hub 1502, that serves as a landing gear, and a central mount for a surveillance camera 1501. The base hub 1502 is coupled to the lower rotor section 1503 through a gimbal motor. The axis of rotation for the gimbal motor is coincident with the axes of rotation for the main drive motor and both rotors. Power is provided to the gimbal motor from a motor controller, which resides in the frame of reference of the lower rotor. As with prior embodiments, the lower rotor includes the battery power source and all electronics, avoiding the need to transfer power between rotating frames of reference. The flight control computer employs a magnetometer to serve as the primary sensor to synchronize cyclic control. Having a direct means to sense the azimuthal orientation of the lower rotor section 1503, the magnetometer also informs the flight control computer how to rotate the gimbal motor such that the base hub 1502 maintains a desired heading. The gimbal motor position relative to the lower rotor section 1503 is informed through the inclusion of an absolute rotary encoder. Under autonomous control or from a ground-based pilot, the base hub 1502, including the camera 1501, is rotated to an arbitrary position on the azimuth, allowing photography over 360 degrees of perspective. For the illustrious embodiment, the gimbal motor is a CubeMars G30. This BLDC motor offers very high torque-to-weight performance, while integrating both the motor driver and absolute encoder within an 83 gram package. As with the geared drive motor described in the earlier embodiment, control of the CubeMars G30 occurs over a CAN-bus interface, simplifying the overall electrical design of the exemplary embodiment. Various related embodiments include a fuselage of large or small size and a gimbal motor to actively position that fuselage below the novel contra-rotating electric helicopter. Some such embodiments include a fuselage large enough to carry human passengers.

The fifth architecture to create a stationary frame of reference is another variant of the embodiment illustrated in FIGS. 14A and 14B. Augmenting the role of the V-tail 1408, the fuselage central section 1407 now includes a gimbal motor/generator, mechanically coupled to the rotary connection to the central cylinder 1406, and electrically coupled with the auxiliary battery system in the fuselage central section 1407. Rather than acting as a passive swivel interface, the gimbal motor/generator allows for the fuselage frame to induce or extract torque from the rotating central cylinder 1406. During hovering conditions without wind, when there is little or no horizontal airflow over V-tail 1408, the fuselage frame of reference will have a tendency to wander in azimuth, without substantial torque acting on the mass suspended from the swivel interface. However, many applications of the contra-rotating electric helicopter require the pilot 1400 to control the heading azimuth while in hover. With the inclusion of a gimbal motor/generator, torque can be induced or extracted, operating at an angular rate that is slightly greater or less than the angular rate of the central cylinder 1406. Such torque translates through the entire fuselage frame, coupled to the base of the gimbal motor/generator, causing the fuselage to yaw either counter-clockwise (induced torque) or clockwise (extracted torque). When torque is induced from the fuselage frame to the rotating central cylinder 1406 frame, the gimbal motor/generator is acting as a motor, extracting power from the auxiliary battery system in the fuselage central section 1407. When torque is extracted from the rotating central cylinder 1406 frame, the gimbal motor/generator is acting as a generator, transferring electrical energy into the auxiliary battery system in the fuselage central section 1407.

Once the exemplary contra-rotating electric helicopter transitions to forward flight, the role of the gimbal motor/generator changes. For a given direction of travel, the fuselage will naturally align itself with the V-tail 1408 in the downwind direction, like the tail on a weathervane. There may be instances when the pilot 1400 wishes to fly with the fuselage facing sideways. However, the aerodynamic force exerted on V-tail 1408 will be great enough to overwhelm the available torque of the gimbal motor/generator, preventing the pilot from turning more than 10 degrees or so from the direction of travel. For this exemplary embodiment, the overwhelming torque produced by the V-tail 1408 in cruising flight is used for advantage. To the extent that the auxiliary battery system in the fuselage central section 1407 is not fully charged, the gimbal motor/generator can extract torque from the rotating central cylinder 1406, generating electrical power to recharge the auxiliary battery system. During this period, the fuselage frame will not rotate in a clockwise direction, because the V-tail 1408 creates an anchoring effect. As soon as the gimbal motor/generator begins to extract torque from the clockwise rotating central cylinder 1406, the fuselage will begin to yaw in a clockwise direction. As the V-tail 1408 angle of attack increases with respect to the airflow, the torque induced by the V-tail 1408 upon the fuselage frame increases, to the limit of the stall angle of the airfoil chosen. Once the torque from the V-tail 1408 reaches the value of the torque extracted from the rotating central cylinder 1406, a trimmed state of flight will be reached, with the heading of the fuselage somewhat offset clockwise from the direction of the incoming air. Recognizing that the increased drag on V-tail 1408 extracts additional energy from the primary battery modules in central cylinder 1406, the process described effectively transfers power from the primary battery module in the central cylinder 1406, to the auxiliary battery system servicing the fuselage frame, contained in fuselage central section 1407. The advantage of this approach is the ability to charge only the primary battery modules in central cylinder 1406 during ground operations, and eliminating the need for slip rings or a rotary transformer to transfer electrical power during flight.

What is claimed is:

1. An electrically powered vertical-lift aircraft, comprising:
   a power source;
   a first electric motor having a base and an output shaft configured to rotate relative to the base, the first electric motor coupled to the power source;
   a first lifting rotor having: (i) a first axis of rotation, (ii) a first rotating frame of reference, and (iii) a first set of rotor blades, the first rotor coupled to the base of the first electric motor;
   a second lifting rotor having a second axis of rotation and a second set of rotor blades, the second axis of rotation being coaxial with the first axis of rotation, the second rotor coupled to the output shaft of the electric motor; and
   a second electric motor in the first rotating frame of reference, and an associated cyclic control computer, configured to cause cyclic pitch adjustment of the first set of rotor blades.

2. The aircraft of claim 1, wherein the first electric motor is of the brushless type, further comprising an electronic speed controller disposed between the power source and the first electric motor.

3. The aircraft of claim 1, further comprising a gear reduction mechanism coupled between the output shaft of the first electric motor and the second lifting rotor.

4. The aircraft of claim 1, wherein the power source includes a battery.

5. The aircraft of claim 1, wherein the power source includes a fuel cell.

6. The aircraft of claim 1, wherein the second lifting rotor has a plane of rotation and is configured with at least one blade of the second set having a coning angle with respect to the plane of rotation.

7. The aircraft of claim 1, wherein a lower portion of the first lifting rotor includes a rotating bearing, the aircraft further comprising a fuselage mounted beneath the rotating bearing.

8. The aircraft of claim 7, further comprising a set of fins having a vertical displacement, the fins being attached to the fuselage, the fins configured to force alignment of the fuselage in the direction of forward flight.

9. An electrically powered vertical-lift aircraft, comprising:
- a power source;
- a plurality of electric motors coupled to the power source, each motor having a base and an output shaft;
- a transmission, coupled to the output shafts of the plurality of electric motors, configured to combine power from the output shafts into a shared output shaft;
- a first lifting rotor, having: (i) a first set of rotor blades, (ii) a first rotating frame of reference, and (iii) a first axis of rotation, coupled to the bases of the plurality of electric motors; and
- a second lifting rotor, having a second set of rotor blades and a second axis of rotation being coaxial with the first axis of rotation, the second lifting rotor being coupled to the shared output shaft; and
- a first cyclic control electric motor in the first rotating frame of reference, and an associated cyclic control computer, configured to cause cyclic pitch adjustment of the first set of rotor blades.

10. The aircraft of claim 9, wherein the power source includes a battery.

11. The aircraft of claim 9, wherein the power source includes a fuel cell.

12. The aircraft of claim 9, wherein at least one rotor blade of the second set has a coning angle with respect to a plane of rotation of the second lifting rotor.

13. The aircraft of claim 9, further comprising a rotating bearing disposed in a lower portion of the first lifting rotor and a fuselage mounted beneath the first lifting rotor.

14. The aircraft of claim 13, further comprising a set of fins having a vertical displacement, the fins being attached to the fuselage, the fins configured to force alignment of the fuselage in the direction of forward flight.

15. The aircraft of claim 9, further comprising a magnetometer in a rotating frame of reference configured to provide an input to a controller to control angle-of-attack of the set of blades.

16. The aircraft of claim 9 further comprising a set of inertial measurement sensors in a rotating frame of reference configured to provide an input to a controller to control angle-of-attack of the set of blades.

17. The aircraft of claim 1, wherein the power source is in the first rotating frame of reference.

18. The aircraft of claim 9, wherein the power source is in the first rotating frame of reference.

\* \* \* \* \*